United States Patent [19]
Ishiyama et al.

[11] Patent Number: 4,830,475
[45] Date of Patent: May 16, 1989

[54] FOCUSING MEANS FOR A ZOOM LENS GROUP

[75] Inventors: Shozo Ishiyama; Tadashi Kojima, both of Hino; Makoto Banno, Hachioji, all of Japan

[73] Assignee: Konishiroku Photo Industry Co., Ltd., Tokyo, Japan

[21] Appl. No.: 131,266

[22] Filed: Dec. 9, 1987

Related U.S. Application Data

[63] Continuation of Ser. No. 11,047, Feb. 5, 1987, abandoned, which is a continuation of Ser. No. 873,462, Jun. 10, 1986, abandoned, which is a continuation of Ser. No. 541,981, Oct. 14, 1983, abandoned, which is a continuation-in-part of Ser. No. 271,644, Jun. 8, 1981, abandoned.

[30] Foreign Application Priority Data

Jun. 10, 1980 [JP] Japan .................................. 55-77124

[51] Int. Cl.$^4$ ............................................ G02B 15/00
[52] U.S. Cl. ...................................... 350/427; 350/255
[58] Field of Search ................ 350/423, 427, 429, 255

[56] References Cited

U.S. PATENT DOCUMENTS

| | | | |
|---|---|---|---|
| 2,908,199 | 10/1959 | Kaprelian | 350/423 |
| 3,191,496 | 6/1965 | Cook | 350/427 |
| 3,752,565 | 8/1973 | Nagashima | 350/429 |
| 3,850,507 | 11/1974 | Uesugi | 350/429 |
| 4,309,076 | 1/1982 | Ito | 350/429 |

Primary Examiner—John K. Corbin
Assistant Examiner—P. M. Dzierzynski
Attorney, Agent, or Firm—Jordan B. Bierman

[57] ABSTRACT

When a zoom lens system is focused by moving a lens other than the foremost lens group, the advancing amount of the focusing lens varies according to the variation in the focal length even whyen focusing on an object at the same object distance. When a zoom lens system is zoomed to a certain focal length, the object distance and advancing amount of the focusing lens has a relationship expressed by a function resembling a logarithmic function. The present invention enables one to focus a zoom lens system using only one movement amount curve by arranging to move the focusing lens along the movement amount curve, utilizing different portions of the movement amount curve according to the amount of zooming.

12 Claims, 15 Drawing Sheets

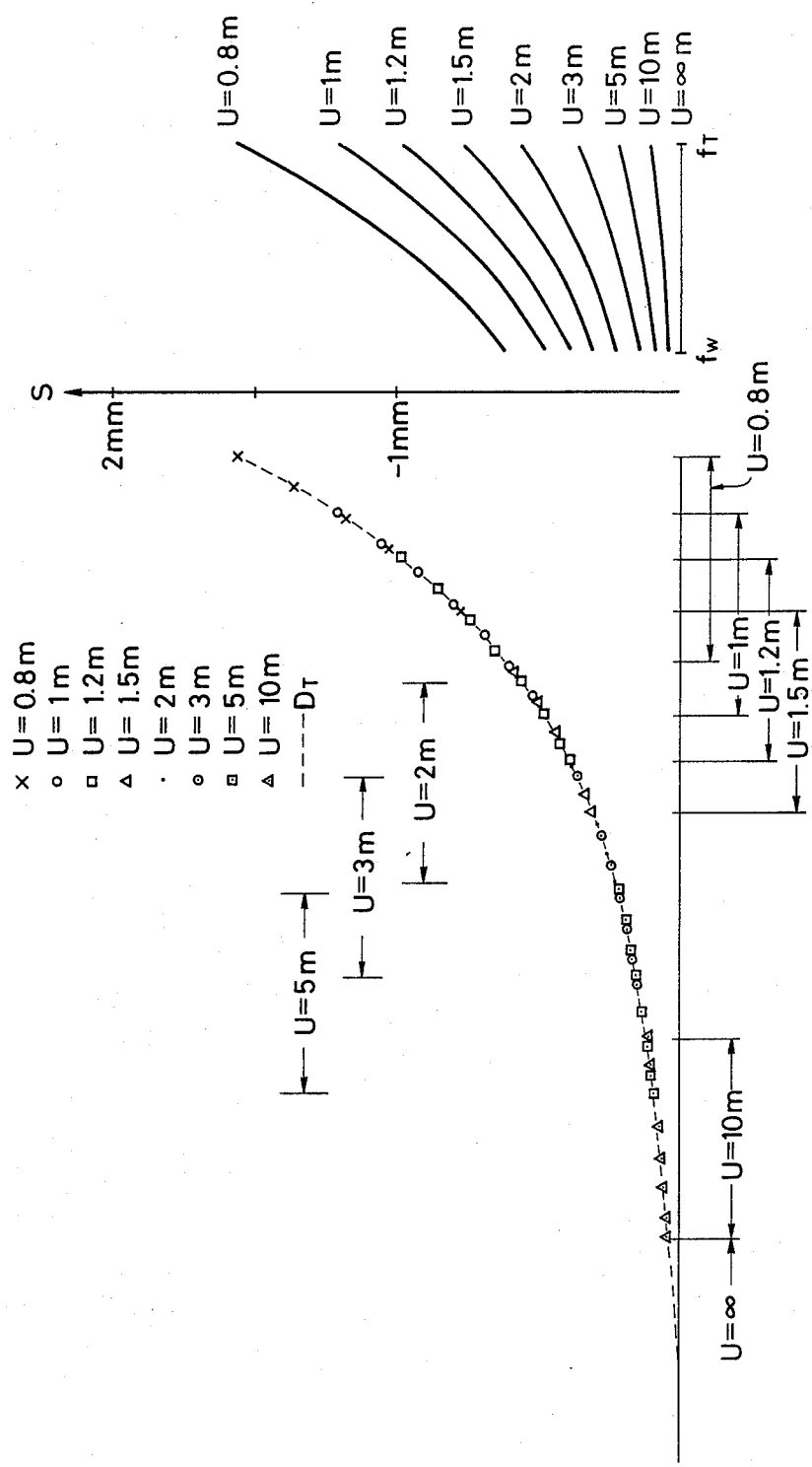

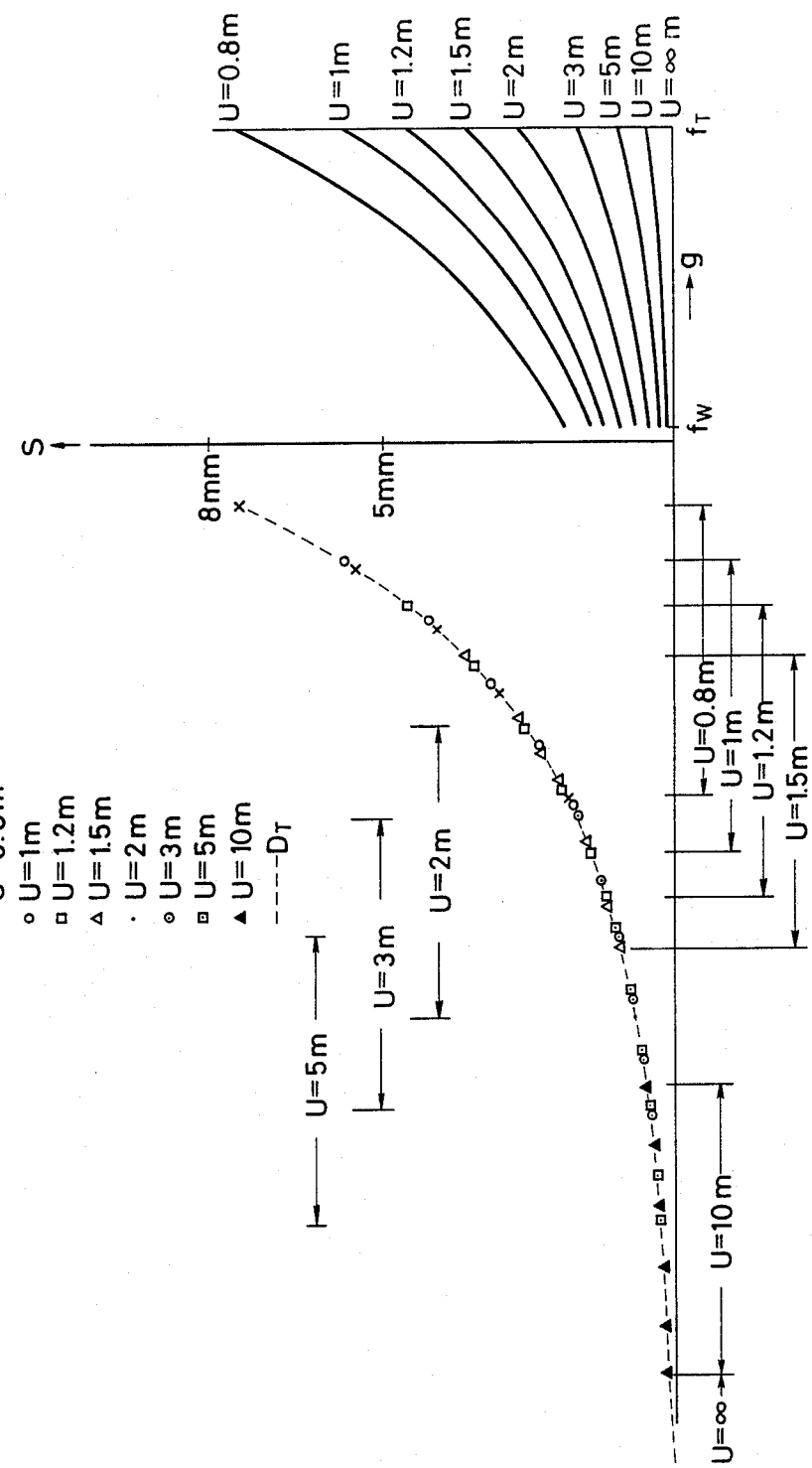

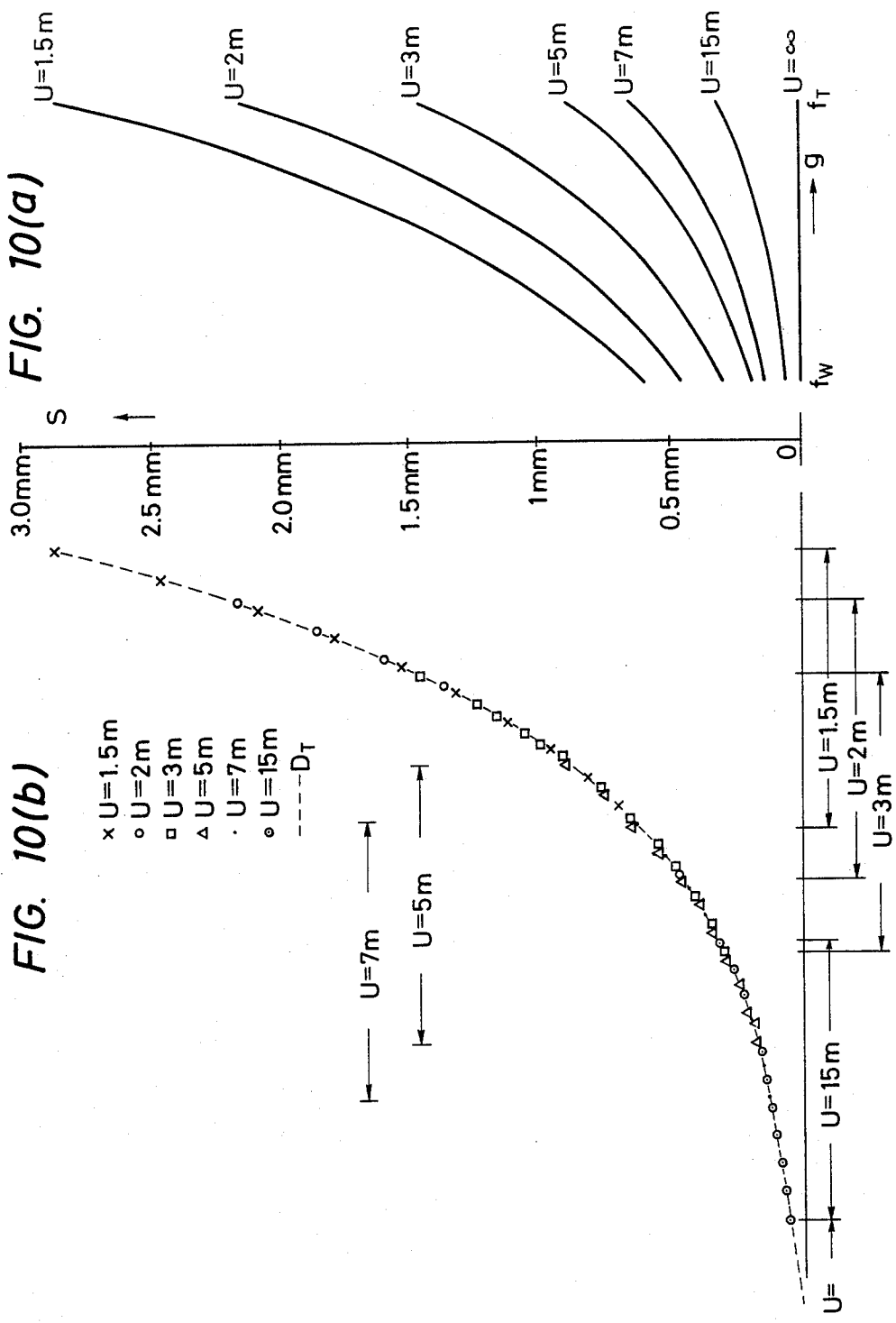

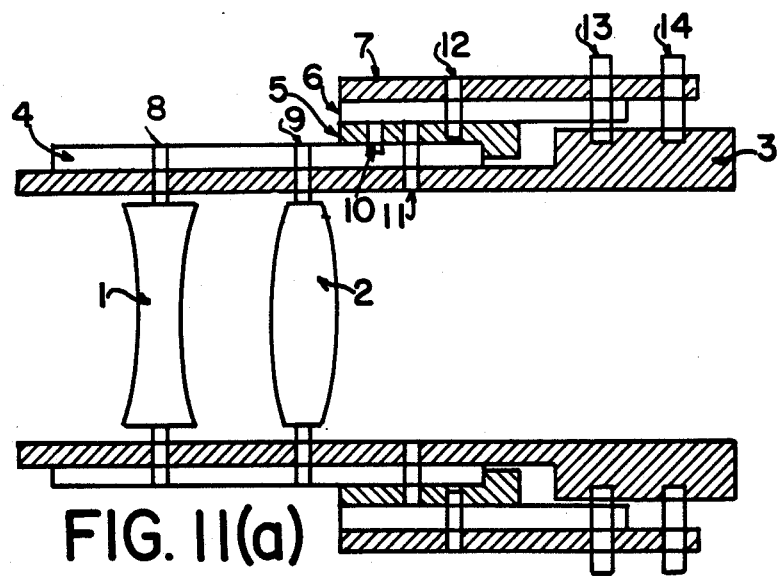
FIG. 11(a)
FIG. 11(b)
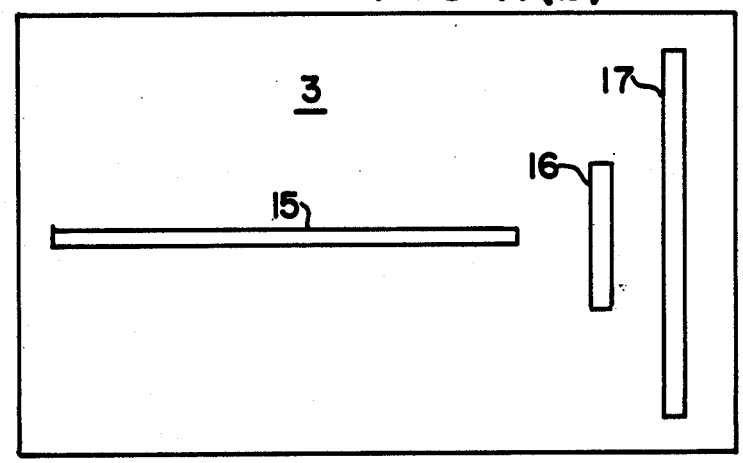
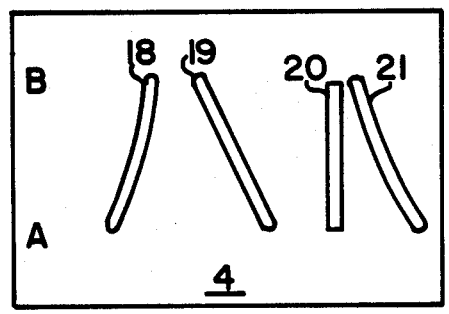
FIG. 11(c)

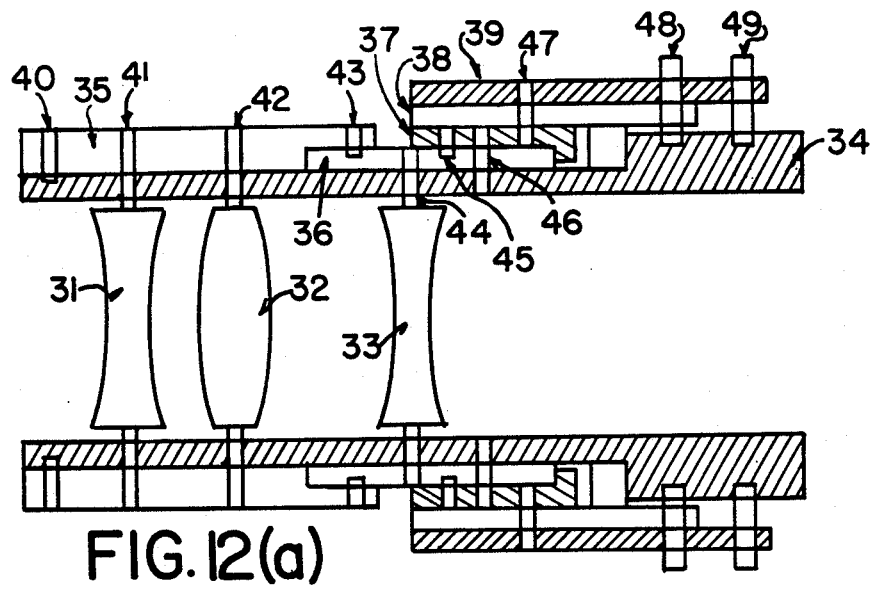
FIG.12(a)
FIG.12(b)
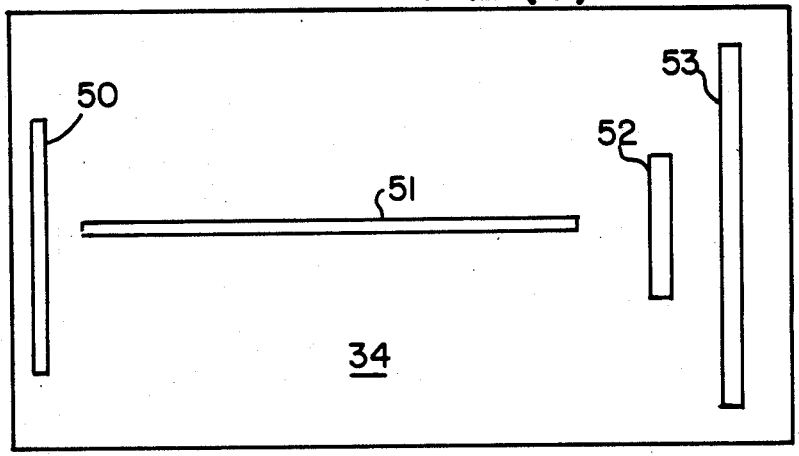
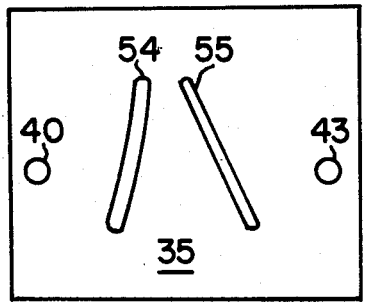
FIG.12(c)
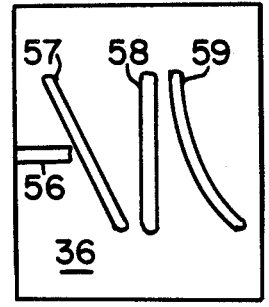
FIG.12(d)

FOCUSING MEANS FOR A ZOOM LENS GROUP

This Application is a Continuation of Ser. No. 11,047, filed Feb. 5, 1987; which is a continuation of Ser. No. 873,462, filed June 10, 1986; which is a continuation of Ser. No. 541,981, filed Oct. 14, 1983, which is a continuation-in-Part of Ser. No. 271,644, filed June 8, 1981 all now abandoned, which, in turn, claims the priority of Japanese 77124/1980, filed June 10, 1980.

BACKGROUND OF THE INVENTION (a) Field of the Invention

The present invention relates to a focusing means for a zoom lens system which enables one to focus a zoom lens system by only one cam, regardless of the variation in the focal length of the zoom lens system as a whole, when focusing the zoom lens system by moving an arbitrary lens group constituting the zoom lens system. This application is a continuation-in-part of our prior application Ser. No. 271,644 filed June 8, 1981.

(b) Description of the Prior Art

Generally, known zoom lens systems are arranged to be focused by moving the foremost lens group thereof. However, in case of a wide-angle zoom lens system, whether or not its front lens group is positive or negative, vignetting in the marginal portion of the field angle caused when the zoom lens system is focused on an object at a comparatively short distance becomes very large, when the zoom lens system is focused by moving the foremost lens group only, unless the lens diameter of the foremost lens group is made very large. In case of a large zoom-ratio zoom lens system with a comparatively small field angle, it is sometimes so arranged that the foremost lens group is divided into several portions and focusing is carried out by moving one of those portions. In this case, however, the number of lenses constituting the lens system increases because the foremost lens group is divided into these several portions.

To eliminate the above-mentioned disadvantage, it may be considered that instead of focusing by moving the foremost lens group only, focusing of the lens system by moving a lens group other than the foremost lens group may be effected by moving a plurality of lens groups including or not including the foremost lens group, or by moving one or more lenses or lens components in those lens groups. In that case, however, the focusing plane moves according to the change in the focal length of the lens system caused by zooming, even when the lens system is focused on an object at the same distance. Therefore, the amount of movement of the lens component for focusing should be changed accordingly in relation to zooming. If one attempts to realize the abovementioned change in the amount of movement by using a cam mechanism, a complicated two-dimensional cam is required, and this is in fact impracticable.

SUMMARY OF THE INVENTION

It is, therefore, a primary object of the present invention to provide a focusing means and mechanism for a zoom lens system enabling one to carry out zooming and focusing at the same time, over the whole zooming range of the zoom lens system, only by approximating the required movement amount of the focusing lens by means of one function and varying the utilizing range of said function according to the distance of the object.

Generally, when a zoom lens system comprises m lens components and ith to jth lens components are arranged as focusing lenses, the movement amount S of each focusing lens from its position for the object distance $\infty$ required when focusing on an object at the object distance U is expressed by the following formula:

$$S = \tfrac{1}{2}\{l_1 - l_\infty \pm \sqrt{(2f_f + h_f - l_u)^2 - 4f_f^2}\} \quad (1)$$

$$\text{where, } \mp \sqrt{(2f_f = h_f - l_\infty)^2 - 4f_f^2}$$

$f_f$: Focal length of the focusing lens system consisting of ith to jth lens components at an arbitrary zoom position of the zoom lens system, $h_f$: Distance between principal points of the above-mentioned focusing lens system at the same zoom position as above, $l_\infty$: Distance between the conjugate point $0_1$ of the partial system consisting of 1st to i−1th lens components in respect the object and conjugate point $I_1$ of the partial system consisting of j+1th to mth lens components in respect to the focal point of the lens system as a whole when the zoom lens system is focused on an object at the infinite distance, $l_u$: Distance between the conjugate point $0_2$ of the prtial system consisting of 1st to i-1th lens components in respect to the object and conjugate point $I_2$ of the partial system consisting of j+1th to mth lens components in respect to the focal point of the lens system as a whole when the zoom lens system is focused on an object at the object distance U.

When the position of the focal point of the lens system as a whole is to be kept constant, $I_2$ coincides with $I_1$.

As it will be understood from the formula (1), the movement amount S of the focusing lens is a function of $l_\infty$, $L_u$, $f_f$ and $h_f$; $l_\infty$ and $l_u$ are determined by the object distance U and focal length f of the lens system as a whole; and $f_f$ and $h_f$ are functions of only the focal length f of the lens system as a whole. Therefore, when the zoom lens system is focused on an object at a predetermined object distance U, the movement amount S of the focusing lens is determined only by the focal length f of the lens system as a whole.

It is difficult to derive a function of movement curve, which can be arranged in a focusing mechanism, from the above formula by handling the movement amount S as the function of the focal length f. However, it is known that the following approxiamtion formula is satisfied when $U \geq 2 f_f$ and $U \geq h_f$:

$$S = f_f^2 / U \ldots \quad (2)$$

Also in case of the above approximation formula, $f_f$ varies according to zooming. When the movement amount S of the focusing lens is graphed by using the focal length f as the parameter, the movement amount S for a certain focal length f becomes linear in respect to the reciprocal 1/U of the object distance as shown in FIG. 2. In the above-mentioned figure, $f_T$ represents the focal length at the tele-position, $f_W$ represents the focal length at the wide position, and many straight lines $f_1$, $f_2$, etc. are distributed corresponding to individual focal lengths in the range where the focal length varies from $f_T$ through $f_w$. Therefore, under these conditions, a two-dimensional cam is required, the focusing mechanism bhecomes too complicated and it is very difficult to put it to practical use.

When, however, an adequate positive real number R (except R=1) is used as a base, the logarithm of the formula (2) becomes as follows.

$$log_R S = 2\, log_R f - log_R U \ldots \quad (3)$$

When the formula is transformed as above, the relation between $log_R S$ and $log_R U$ becomes as graphed in FIG. 2, i.e., variation of the parameter f is expressed by a group of parallel lines having the same inclination. Therefore, when a moving mechanism for moving the focusing lens group along these straight lines is provided, variation of the movement amount S due to variation of the focal length f to be caused by zooming is materialized by shifting the utilizing portion of said moving mechanism by the value α or β.

That is, the formula (3) becomes as shown below.

$$S = R\,(2log_R f - log_R u) \ldots \quad (4)$$

When the focal length $f_f$ of the focusing lens group becomes $f_{fT}$ at the tele-position and $f_{fW}$ at the wide position, the movement amount $S_u$ of the focusing lens group in respect to the object distance U varies from $$S_u = R\,(2log_R f_{fT} - log_R u)$$

to $$S_u = R\,(2log_R f_{fW} - log_R u)$$

When the nearest object distance at which focusing is possible with a certain focal length f is represented by $U_n$, the object distance U varies from ∞ to $U_n$, i.e., from $$S_f = R\,(2log_R f_f - log_R \infty) = 0$$

to $$S_f = R\,(2log_R f_f - log_R u_n)$$

That is, the formula (4) expresses the movement of the focusing lens group required for focusing by coping with all the variations of object distance and variation of focal length. Therefore, it is possible to simplify the focusing mechanism by arranging to move the focusing lens group using the formula (4) with combined operation with zooming.

BRIEF DESCSRIPTION OF THE DRAWINGS

Figure 1:
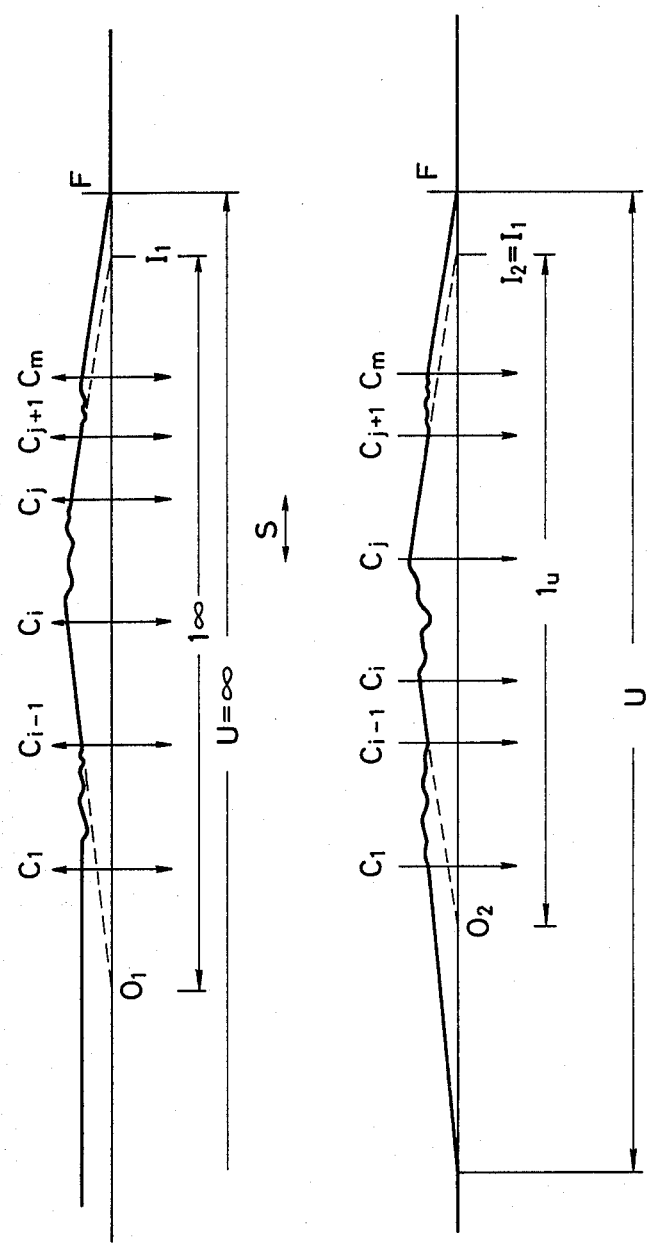
FIG. 1 shows an explanatory figure illustrating the method for obtaining the movement amount of the focusing lens by the focusing means according to the present invention.
Figure 2:
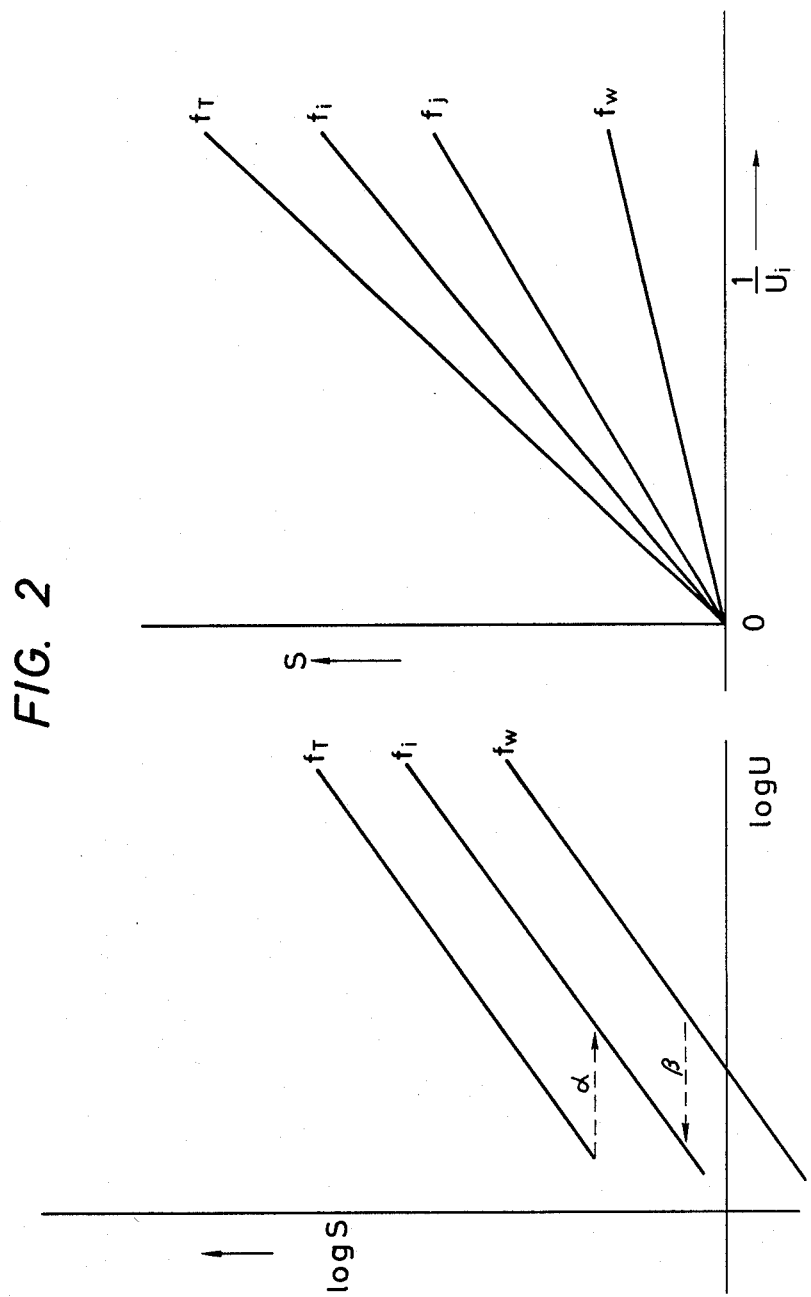
FIG. 2 shows an explanatory figure illustrating the theory of an embodiment of the present invention.
Figure 3:
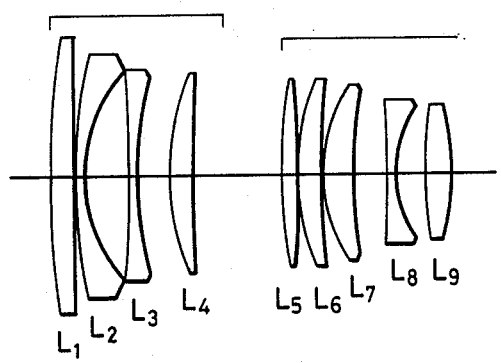
Figure 4:
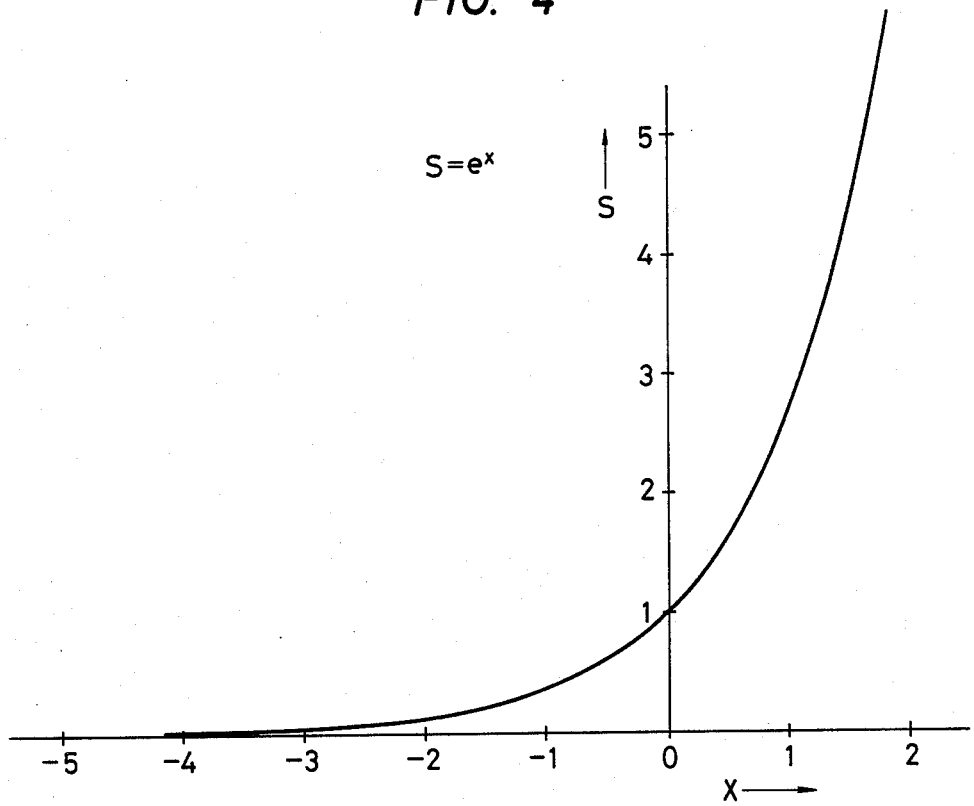
Figure 5A:
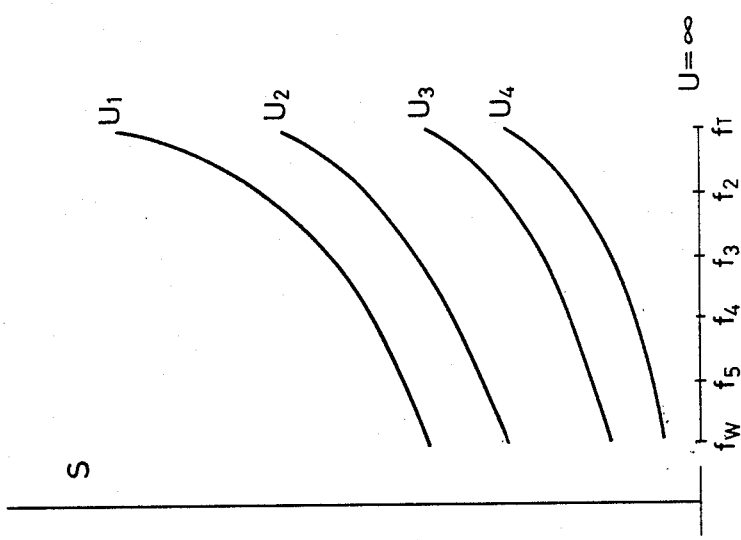
Figure 5B:
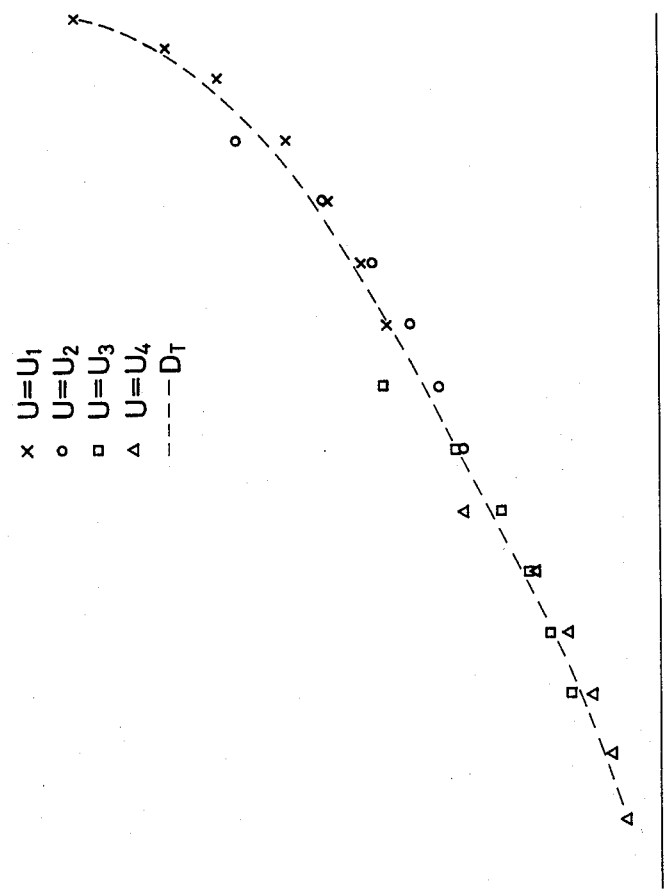
Figure 9:
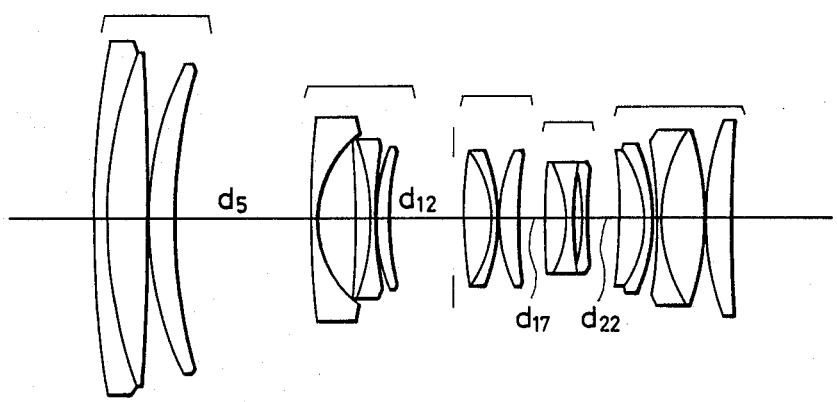
Figure 11D:
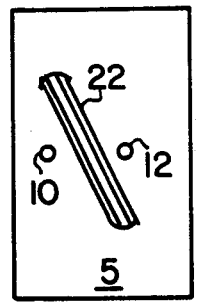
Figure 11E:
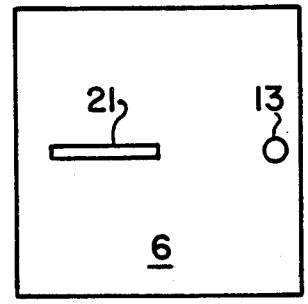
Figure 11F:
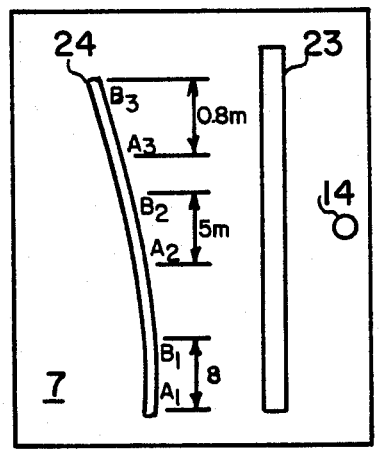
Figure 12E:
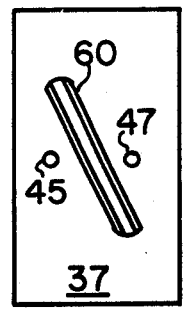
Figure 12F:
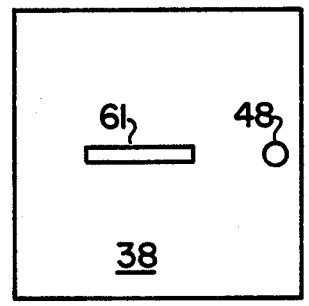
Figure 12G:
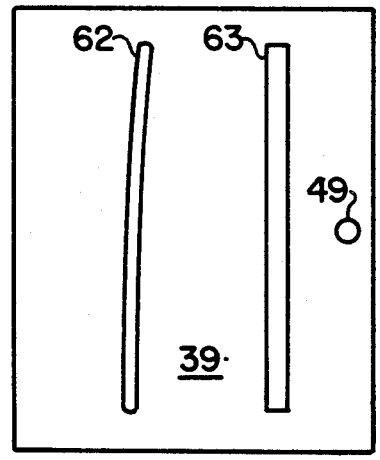
Figure 13A:
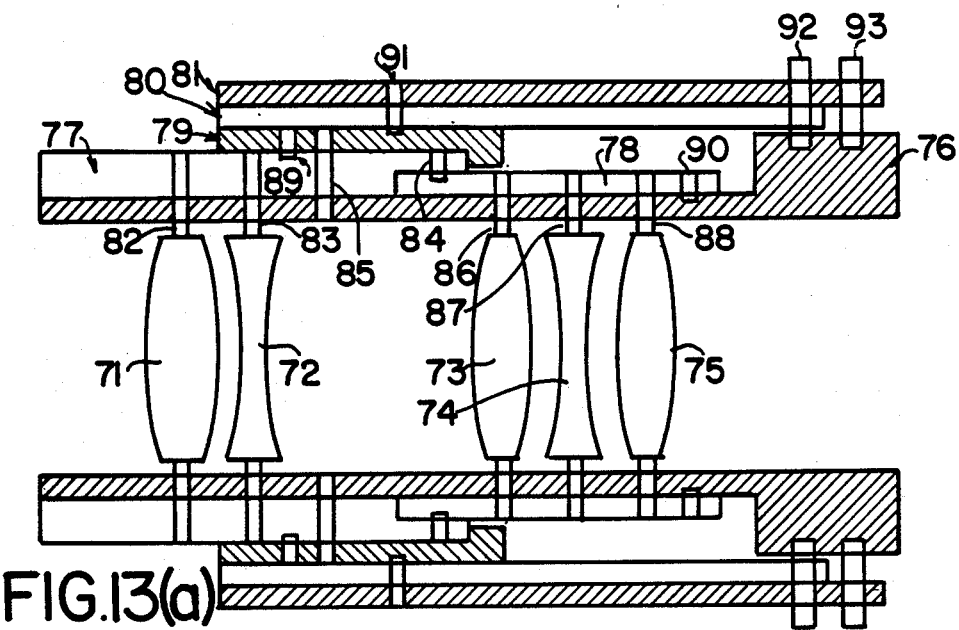
Figure 13B:
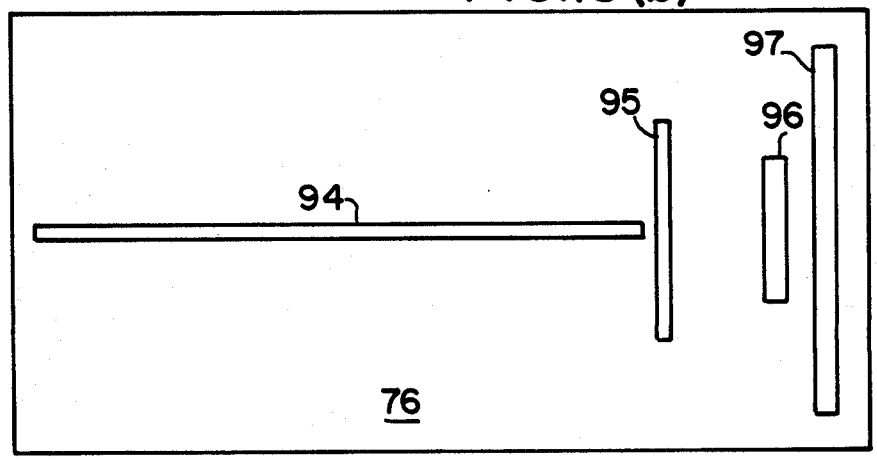
Figure 13C:
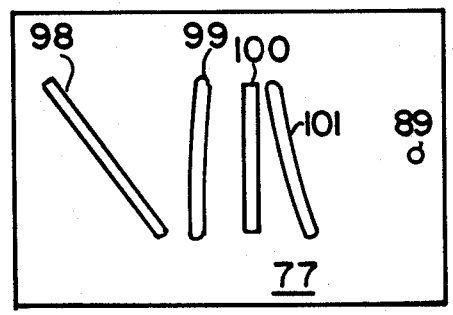
Figure 13D:
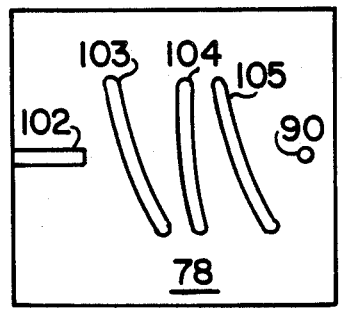
Figure 13E:
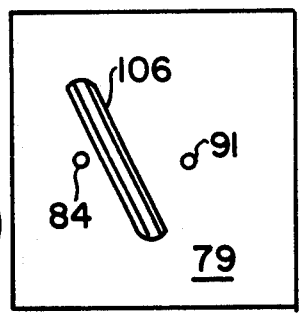
Figure 13F:
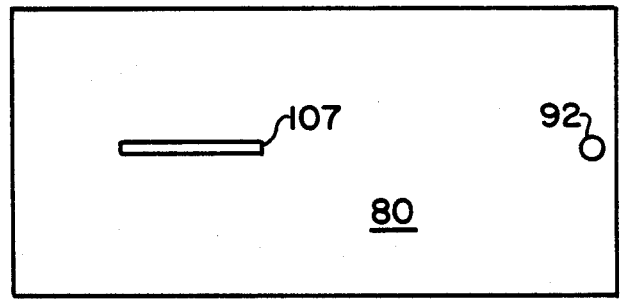
Figure 13G:
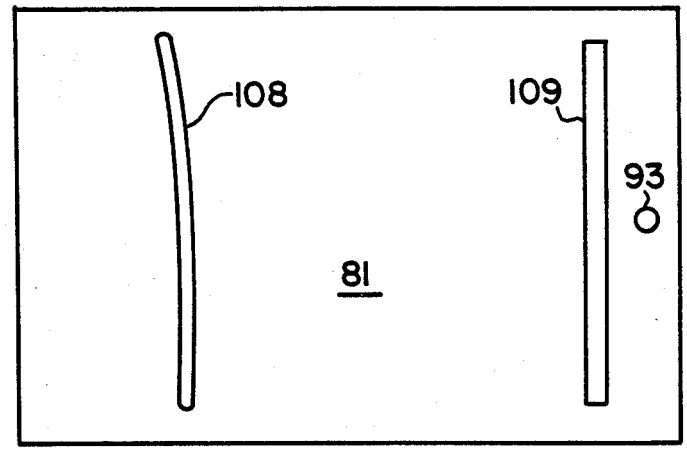

FIGS. 3 and 9 respectively show sectional views of zoom lens systems used for embodiments of the present invention;

FIG. 4 shows an example of the movement amount curve of the focusing lens;

FIG. 5 shows a movement amount curve when the parameter g is not introduced in;

FIGS. 6, 7, 8 and 10 respectively show other examples of the movement amount curves for the zoom lens systems shown in FIGS. 3 and 9.

FIGS. 11(a)–11(f) are sectional and plan views showing an illustrative mechanism for a zoom lens composed of two groups having respectively a negative and positive focal length, of the type shown in FIG. 3;

FIGS. 12(a)–(g) are sectional and plan views showing an illustrative mechanism for a zoom lens composed of two groups of which the first group has a negative focal length and in which the second lens group includes a positive set of lenses as in FIG. 3 and an additional set of lenses for focusing;

FIGS. 13(a)–(g) are sectional and plan views showing an illustrative mechanism for a zoom lens composed of five groups of the type shown in FIG. 9.

DETAILED DESCRIPTION OF THE PREFERRED EMBODIMENTS

Preferred embodiments of the focusing means for a zoom lens system according to the present invention are described below.

In the present invention, the approximation formula (2) enables one to obtain favorable approximation in case the focusing lens group contains the foremost lens group and, therefore, embodiments for this case are described at first.

FIG. 3 shows a sectional view of a two-group zoom lens system in which the front lens group is arranged as a negative lens group. The numerical data of this lens system are given in Table 1 which follows. As is generally known, variation of the focal length of the lens system as a whole, i.e., zooming, is effected by varying only the eighth distance $D_8$ between lens surfaces as counted in the order from the object side. The relation between the focal length and $D_8$ is given in Table 2.

Table 3 gives the movement amounts S of lens groups required when focusing this zoom lens system by moving the first lens group and the second lens group, i.e., the lens system as a whole, said movement amounts S being obtained by the formula (4) in relation to the focal length of the lens system as a whole and object distance. Here, the base e of natural logarithm is selected as R in the formula (4).

Besides, Table 4 and FIG. 4 show the relation between X and focal length of the lens system as a whole when X is as follows.

$$X = 2\, log\, f_f - log\, U$$

For the object distance $U = 2$ m, for example, the range from the position of $X = 0.871$ to the position of $X = -0.471$ in FIG. 4 represents the curve of movement amounts S, and the lens advancing amount required for focusing the lens system varies from 2.390 mm to 0.624 mm. When the above-mentioned variation of lens advancing amount is effected in combined operation with zooming by using an adequate means such as a cam mechanism, it is possible to keep the focusing plane constant at the time of zooming.

As the formula (4) is an approximation formula as described before, the lens movement amounts S without approximation are given in Table 5 in order to examine the accuracy of the above-mentioned focusing method. When Table 5 is compared with Table 3, it will be understood that the approximation accuracy is 0.1 mm or less in case the object distance is larger than about 50 times the focal length. Though the degree of tolerable error differs with various conditions, the tolerance becomes large when the F number of the zoom lens system is large.

In case of rough approximation, it is possible to approximate the movement amount curve of the focusing lens by means of an exponential function as described in the above. However, to carry out focusing of a zoom lens system with a small F number up to a short object distance, it is necessary to further raise the approximation accuracy.

FIG. 5 (a) shows a graph of movement amounts S of the focusing lens in relation to the focal length f worked out by using the object distance U as the parameter. FIG. 5 (b) shows a movement amount curve $D_T$ obtained by integrating the movement amount curves for individual object distances shown in FIG. 5 (a) into one curve by shifting the origin, said movement amount curve $D_T$ being obtained so that the sums of squares of distances from the movement amount curves for individual object distances to the movement amount curve $D_T$ are minimized.

Figure 6A:
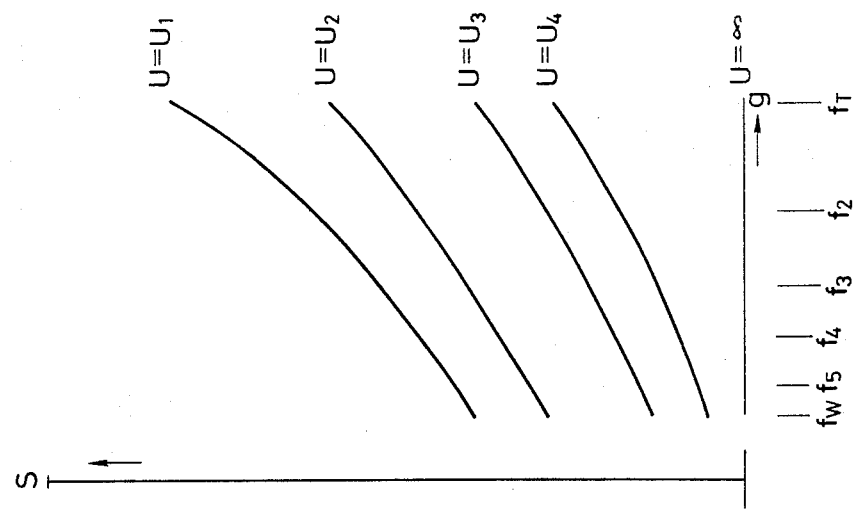
Figure 6B:
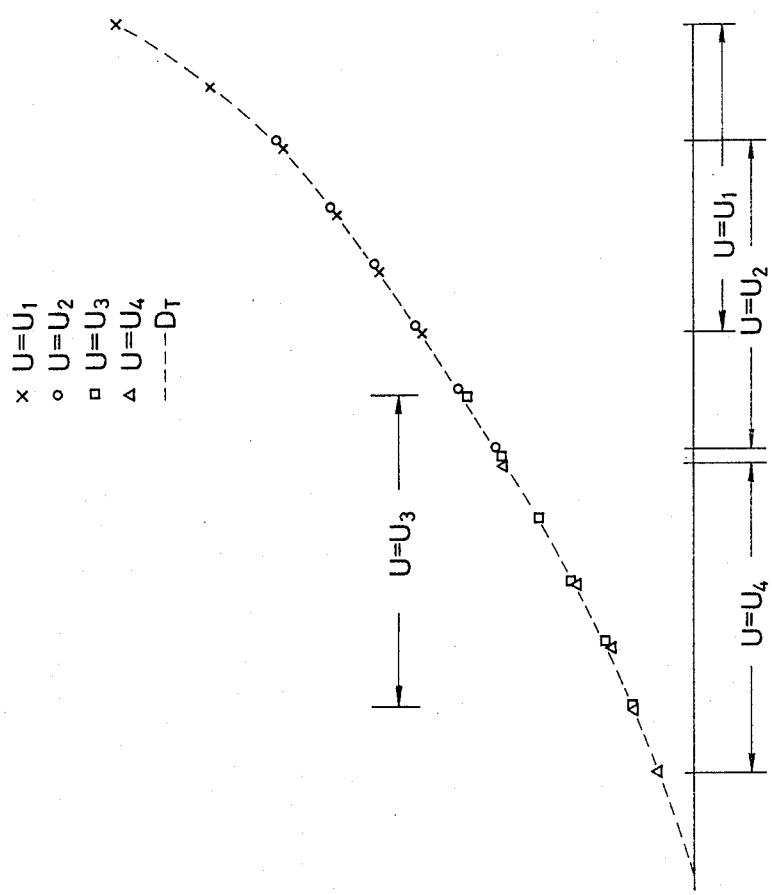

In this method, however, it is not possible to obtain a movement amount curve $D_T$ which gives favourable approximation because the individual movement amount curves are rising steeply on the tele-position side as shown in FIG. 5 (a). To solve this problem, shapes of the movement amount curves for individual object distances are altered by varying the rate of variation of the focal length f on the axis of abscissa as shown in FIG. 6 (a). To be concrete, this can be easily materialized when, for example, the lens movement amount for zooming is used as the parameter, the rate of variation of the focal length in respect to this parameter g is varied by a cam or the like, and the parameter g is used as the axis of the abscissa. By adequately effecting the above-mentioned conversion, it is possible to obtain an integrated movement amount curve $D_T$ which favourably coincides with the movement amount curves for individual object distances as shown in FIG. 6 (b).

For example, Table 6 gives the movement amounts of the focusing lenses in relation to the focal lengths and object distances in the case where a two-group zoom lens system shown in FIG. 3 is focused by integrally moving the eighth and ninth lens components which constitute the second positive lens group. In this table, g represents the parameter which determines the rate of variation of the focal length f, and its value is selected as 0 in the tele-position and 100 in the wide position. When zooming is carried out by keeping the relation $f_{(g)}$ between the parameter g and focal length as given in Table 6, it is possible to favorably interlock the movement of the focusing lens for every object distance, with the zooming operation by means of only one movement amount curve $D_T$.

FIG. 7 shows a graphic illustration of Table 6 wherein FIG. 7(a) shows a group of movement amount curves for several object distances, and FIG. 7(b) shows the relationship between the individual movement amount curves shown in FIG. 7(a) and one movement amount curve $D_T$ obtained by integrating the individual movement amount curves by shifting the origin so that the sums of squares of distances from the individual movement amount curves to the movement amount curve $D_T$ are minimized. As will be understood from FIG. 7, the individual movement amount curves shown in FIG. 7(a) favorably coincide with the curve $D_T$. In case the lens system is to be zoomed after focusing it on an object at a particular object distance $U_i$, it is possible to maintain the lens system in the focused state during zooming when the focusing lens is moved in combined operation with zooming by using the portion of the curve $D_T$ shown in FIG. 7(b) which corresponds to $U_i$.

For the afore-mentioned embodiment wherein the lens system is focused by moving the lens system as a whole using the approximation formula (4), it is also possible to improve the focusing accuracy by introducing the parameter g. Table 7 gives the lens movement amounts in that case in relation to the focal length f, parameter g and object distance U. FIG. 8 shows a group of lens system movement amount curves for individual object distances in FIG. 8 (a) and their relation to the integrated movement amount curve $D_T$ in FIG. 8 (b). Compared with Table 3, it is evident that the focusing accuracy is improved.

In the case of a zoom lens system with two-group lens configuration having the first lens group arranged as a negative lens group as shown in FIG. 3, focusing is generally carried out by moving the first lens group. In this case, vignetting in the marginal portion of the field angle becomes larger as the object distance becomes shorter, unless the lens diameter of the first lens group is made large. When, however, the lens system is focused by moving a part of the second lens group or moving the lens system as a whole as described in the above, it is possible to carry out focusing up to a short object distance without causing a large vignetting in the marginal position of the field angle even when the lens diameter of the first lens group is not made large.

As still another embodiment, a focusing means for a zoom lens system with five-group lens configuration having the lens section shown in FIG. 9 is described below.

This lens system has the numerical data given in Table 8 and is zoomed by varying the fifth distance $D_5$, twelfth distance $D_{12}$, seventeenth distance $D_{17}$ and twenty-second distance $D_{22}$ between lens surfaces as counted in the order for the object side. The relation between the focal length of the lens system as a whole and distances $D_5$, $D_{12}$, $D_{17}$ and $D_{22}$ is given in Table 9.

For this zoom system, Table 10 gives the movement amounts of focusing lenses in relation to the focal length of the lens system as a whole and object distance required when focusing is carried out by moving the first and second lens groups. The content of Table 10 is graphed in FIG. 10. Also in this embodiment, the movement amount curves of focusing lenses for the individual object distances shown in FIG. 10 (a) favourably coincide with the corresponding portions of the movement amount curve $D_T$ shown in FIG. 10 (b).

When the zoom lens system as shown in FIG. 9 having the front lens group arranged as a positive lens group is focused by moving the first lens group only in the state in which the wide angle is also included in the zoom range, vignetting in the marginal portion of the field angle becomes very large at a position near the wide position, as the object distance becomes shorter, unless the lens diameter of the first lens group is made very large and, as a result, it becomes unsuitable for practical use. When, however, said zoom lens system is focused by moving the first and second lens groups, it is possible to carry out focusing up to a short object distance in the state that vignetting is small even when the lens diameter of the first lens group is not made large.

When the focusing means according to the present invention is used, the focusing error of a zoom lens system becomes very small as it is evident from FIGS. 7, 8 and 10, i.e., becomes smaller than 0.01 mm or 0.02 mm at the most, and even a zoom lens system with a small F number is made sufficiently suitable for practical use when photographing an object at a short distance.

Table 1: Lens data
 (a) When
  R: Radius of curvature
  D: Distance between lens surfaces
  $n_d$: Refractive index for d-line
  $\nu$: Abbe's number
 (b) Surface No.
 (c) First lens group
 (d) Second lens group
 (e) Variable Table 2: Focal length and movement amounts of lens groups
 (f) Focal length
 (g) Back focal length
 (h) Tele-position
 (i) Wide position
 (j) In the table in the above, DELTAC$_1$ and DELTAC$_2$ respectively represent the movement amount of the first lens group and second lens group from the reference (longest focal length), a positive value thereof shows a movement toward the object side and a negative value thereof shows a movement toward the image side.

Table 3: Movement amounts of focusing lens groups (Calculated with $S=e^X$)
 (k) Focal length Table 4: Values of X
 (l) Focal length Table 5: Movement amounts of focusing lens groups (Without approximation)
 (m) Focal length Table 6: Movement amounts when focusing by integrally moving the eighth and ninth lens components
 (n) Focal length
 (o) Value of g
 (p) In the table in the above, the value of g represents the position of the focal length located between the longest focal length selected as 0 and the shortest focal length selected as 100. A movement amount of negative value shows a movement toward the image side.

Table 7: Movement amounts when focusing by moving the lens system as a whole
 (q) Focal length
 (r) Value of g
 (s) In the table in the above, the value of g has the same meaning as the case of Table 3. A movement amount of positive value shows a movement toward the object side.

Table 8: Lens data
 (a) when
  R: Radius of curvature
  D: Distance between lens surfaces
  $n_d$: Refractive index for d-line
  $\nu$: Abbe's number
 (b) Surface No. (c) First lens group
 (d) Variable
 (e) Second lens group (f) Variable
 (g) Third lens group
 (h) Variable
 (i) Fourth lens group
 (j) Variable
 (k) Fifth lens group Table 9: Focal length and distance between lens groups
 (l) Focal length
 (m) Back focal length
 (n) Tele-position
 (o) Wide position Table 10: Movement amounts when focusing by moving the first and second lens groups
 (p) Focal length
 (q) Value of g
 (r) In the table in the above, the value of g represents the position of the focal length located between the longest focal length selected as 0 and the shortest focal length selected as 100.

A movement amount of positive value shows a movement toward the object side.

TABLE 1

Lens data
(a) When R: Radius of curvature
D: Distance between lens surfaces
$n_d$: Refractive index for d-line
$\nu$: Abbe's number

| (b) Surface No. | | R | D | nd | ν |
|---|---|---|---|---|---|
| 1 | | 172.036 | 3.50 | 1.62004 | 36.3 |
| 2 | | ∞ | 0.10 | | |
| 3 | (c) First | 82.224 | 1.70 | 1.77250 | 49.6 |
| 4 | lens group | 23.297 | 7.60 | | |
| 5 | | −373.238 | 1.50 | 1.77250 | 49.6 |
| 6 | | 69.199 | 5.50 | | |
| 7 | | 41.501 | 4.00 | 1.62004 | 36.3 |
| 8 | | 251.042 | | | |
| | | | (e) Variable | | |
| 9 | | 100.564 | | 1.69680 | 55.5 |
| 10 | | −292.325 | 2.60 | | |
| 11 | | 39.613 | 0.10 | 1.56883 | 61.1 |
| 12 | | 149.413 | 4.00 | | |
| 13 | (d) Second | 22.672 | 0.10 | 1.51633 | 64.1 |
| 14 | lens group | 96.429 | 5.50 | | |
| 15 | | −341.320 | 5.50 | 1.80518 | 25.4 |
| 16 | | 19.037 | 1.60 | | |
| 17 | | 85.004 | 5.00 | 1.62004 | 36.3 |
| 18 | | −38.022 | 4.50 | | |

TABLE 2

Focal length and movement amounts of lens groups

| | (f) Focal length | (g) Back focal length | D$_8$ | DELTAC$_1$ | DELTAC$_2$ |
|---|---|---|---|---|---|
| (h) Tele-position | 69.140 | 72.857 | 0.5 | 0 | 0 |
| | 63.608 | 68.534 | 3.5 | −1.323 | −4.323 |
| | 58.896 | 64.851 | 6.5 | −2.006 | −8.006 |
| | 54.833 | 61.677 | 9.5 | −2.180 | −11.180 |
| | 51.296 | 58.912 | 12.5 | −1.945 | −13.945 |
| | 48.186 | 56.482 | 15.5 | −1.375 | −16.375 |
| | 45.433 | 54.330 | 18.5 | −0.527 | −18.527 |
| | 42.977 | 52.411 | 21.5 | 0.554 | −20.446 |
| | 40.793 | 50.688 | 24.5 | 1.831 | −22.169 |
| | 38.784 | 49.134 | 27.5 | 3.297 | −23.723 |
| (i) Wide position | 36.980 | 47.724 | 30.5 | 4.867 | −25.133 |
| | 35.336 | 46.440 | 33.5 | 6.583 | −26.417 |

(j) In the table in the above, DELTAC$_1$ and DELTAC$_2$ respectively represent the movement amounts of the first lens group and second lens group from the reference (longest focal length), a positive value thereof shows a movement toward the object side and a negative value thereof shows a movement toward the image side.

TABLE 3

Movement amount of focusing lens groups
(Calculated with $S = e^X$)

| (k) Focal length | U = 1 m | U = 1.2 m | U = 1.5 m | U = 2 m | U = 3 m | U = 5 m | U = 10 m | U = 20 m | U = 50 m |
|---|---|---|---|---|---|---|---|---|---|
| 69.140 | 4.780 | 3.984 | 3.187 | 2.390 | 1.593 | 0.956 | 0.478 | 0.239 | 0.096 |
| 63.608 | 4.046 | 3.372 | 2.697 | 2.023 | 1.349 | 0.809 | 0.405 | 0.202 | 0.081 |
| 58.896 | 3.469 | 2.891 | 2.312 | 1.734 | 1.156 | 0.694 | 0.347 | 0.173 | 0.069 |
| 54.833 | 3.007 | 2.506 | 2.004 | 1.503 | 1.002 | 0.601 | 0.301 | 0.150 | 0.060 |
| 51.296 | 2.631 | 2.193 | 1.754 | 1.316 | 0.877 | 0.526 | 0.263 | 0.132 | 0.053 |
| 48.186 | 2.392 | 1.935 | 1.548 | 1.161 | 0.774 | 0.464 | 0.232 | 0.116 | 0.046 |
| 45.433 | 2.064 | 1.720 | 1.376 | 1.032 | 0.688 | 0.413 | 0.206 | 0.103 | 0.041 |
| 42.977 | 1.847 | 1.539 | 1.231 | 0.924 | 0.616 | 0.369 | 0.185 | 0.092 | 0.037 |
| 40.793 | 1.664 | 1.387 | 1.109 | 0.832 | 0.555 | 0.333 | 0.166 | 0.083 | 0.033 |
| 38.784 | 1.504 | 1.253 | 1.003 | 0.752 | 0.501 | 0.301 | 0.150 | 0.075 | 0.030 |
| 36.980 | 1.368 | 1.140 | 0.912 | 0.684 | 0.456 | 0.274 | 0.137 | 0.068 | 0.027 |
| 35.336 | 1.249 | 1.041 | 0.832 | 0.624 | 0.416 | 0.250 | 0.125 | 0.062 | 0.021 |

TABLE 4

Values of X

| (l) Focal length | U = 1 m | U = 1.2 m | U = 1.5 m | U = 2 m | U = 3 m | U = 5 m | U = 10 m | U = 20 m | U = 50 m |
|---|---|---|---|---|---|---|---|---|---|
| 69.140 | 1.565 | 1.382 | 1.159 | 0.871 | 0.466 | −0.045 | −0.738 | −1.431 | −2.348 |
| 63.608 | 1.398 | 1.215 | 0.992 | 0.705 | 0.299 | −0.212 | −0.905 | −1.598 | −2.514 |
| 58.896 | 1.244 | 1.062 | 0.838 | 0.551 | 0.145 | −0.366 | −1.059 | −1.752 | −2.668 |
| 54.833 | 1.101 | 0.919 | 0.695 | 0.408 | 0.002 | −0.509 | −1.202 | −1.895 | −2.811 |
| 51.296 | 0.968 | 0.785 | 0.562 | 0.274 | −0.131 | −0.642 | −1.335 | −2.028 | −2.945 |
| 48.186 | 0.842 | 0.660 | 0.437 | 0.149 | −0.256 | −0.767 | −1.460 | −2.153 | −3.070 |
| 45.433 | 0.725 | 0.542 | 0.319 | 0.032 | −0.374 | −0.885 | −1.578 | −2.271 | −3.187 |
| 42.977 | 0.614 | 0.431 | 0.208 | −0.080 | −0.485 | −0.996 | −1.689 | −2.382 | −3.298 |
| 40.793 | 0.509 | 0.327 | 0.104 | −0.184 | −0.589 | −1.100 | −1.793 | −2.487 | −3.403 |
| 38.784 | 0.408 | 0.226 | 0.003 | −0.285 | −0.690 | −1.201 | −1.894 | −2.588 | −3.504 |
| 36.980 | 0.313 | 0.131 | −0.093 | −0.380 | −0.786 | −1.296 | −1.990 | −2.683 | −3.599 |
| 35.336 | 0.222 | 0.040 | −0.183 | −0.471 | −0.877 | −1.387 | −2.081 | −2.774 | −3.690 |

TABLE 5

Movement amounts of focusing lens groups
(Without approximation)

| (m) Focal length | U = 1 m | U = 1.2 m | U = 1.5 m | U = 2 m | U = 3 m | U = 5 m | U = 10 m |
|---|---|---|---|---|---|---|---|
| 69.140 | 5.721 | 4.611 | 3.573 | 2.600 | 1.683 | 0.988 | 0.486 |
| 63.608 | 4.789 | 3.869 | 3.004 | 2.190 | 1.420 | 0.834 | 0.411 |
| 58.896 | 4.070 | 3.294 | 2.562 | 1.870 | 1.215 | 0.714 | 0.352 |
| 54.833 | 3.503 | 2.839 | 2.211 | 1.616 | 1.051 | 0.619 | 0.305 |
| 51.296 | 3.049 | 2.474 | 1.929 | 1.411 | 0.918 | 0.541 | 0.267 |
| 48.186 | 2.679 | 2.175 | 1.698 | 1.243 | 0.809 | 0.477 | 0.235 |
| 45.433 | 2.373 | 1.929 | 1.506 | 1.103 | 0.719 | 0.424 | 0.209 |
| 42.977 | 2.118 | 1.722 | 1.345 | 0.986 | 0.643 | 0.379 | 0.187 |
| 40.793 | 1.902 | 1.548 | 1.209 | 0.887 | 0.578 | 0.341 | 0.168 |
| 38.784 | 1.719 | 1.399 | 1.093 | 0.802 | 0.523 | 0.308 | 0.152 |
| 36.980 | 1.561 | 1.271 | 0.993 | 0.729 | 0.475 | 0.280 | 0.138 |
| 35.336 | 1.424 | 1.160 | 0.907 | 0.665 | 0.434 | 0.256 | 0.126 |

TABLE 6

Movement amounts when focusing by integrally
moving the eighth and ninth lens components

| Focal length | Value of g | U = 0.8 m | U = 1 m | U = 1.2 m | U = 1.5 m | U = 2 m | U = 3 m | U = 5 m | U = 10 m |
|---|---|---|---|---|---|---|---|---|---|
| 69.140 | 0 | −1.566 | −1.205 | −0.980 | −0.765 | −0.560 | −0.365 | −0.215 | −0.106 |
| 63.608 | 11.515 | −1.404 | −1.082 | −0.881 | −0.688 | −0.505 | −0.329 | −0.194 | −0.096 |
| 58.896 | 22.424 | −1.268 | −0.978 | −0.797 | −0.623 | −0.457 | −0.298 | −0.176 | −0.087 |
| 54.833 | 32.727 | −1.151 | −0.889 | −0.725 | −0.567 | −0.416 | −0.272 | −0.160 | −0.079 |
| 51.296 | 42.424 | −1.051 | −0.813 | −0.662 | −0.519 | −0.381 | −0.249 | −0.147 | −0.073 |
| 48.186 | 51.515 | −0.964 | −0.746 | −0.608 | −0.476 | −0.350 | −0.229 | −0.135 | −0.067 |
| 45.433 | 60.606 | −0.888 | −0.687 | −0.561 | −0.439 | −0.323 | −0.211 | −0.124 | −0.062 |
| 42.977 | 69.091 | −0.821 | −0.636 | −0.519 | −0.406 | −0.299 | −0.195 | −0.115 | −0.057 |
| 40.793 | 76.970 | −0.762 | −0.590 | −0.481 | −0.377 | −0.277 | −0.181 | −0.107 | −0.053 |
| 38.784 | 84.242 | −0.709 | −0.549 | −0.448 | −0.351 | −0.258 | −0.169 | −0.100 | −0.049 |
| 36.980 | 91.515 | −0.662 | −0.513 | −0.418 | −0.328 | −0.241 | −0.157 | −0.093 | −0.046 |
| 35.336 | 100 | −0.620 | −0.480 | −0.391 | −0.307 | −0.225 | −0.147 | −0.087 | −0.043 |

(p) In the table in the above, the value of g represents the position of the focal length located between the longest focal length selected as 0 and the shortest focal length selected as 100. A movement amount of positive value shows a movement toward the object side.

TABLE 7

Movement amounts when focusing by moving the lens system as a whole

| Focal length | Value of g | U = 0.8 m | U = 1 m | U = 1.2 m | U = 1.5 m | U = 2 m | U = 3 m | U = 5 m | U = 10 m |
|---|---|---|---|---|---|---|---|---|---|
| 69.140 | 0 | 7.543 | 5.721 | 4.611 | 3.573 | 2.600 | 1.683 | 0.988 | 0.486 |
| 63.608 | 12.105 | 6.288 | 4.789 | 3.869 | 3.004 | 2.190 | 1.420 | 0.834 | 0.411 |
| 58.896 | 23.684 | 5.327 | 4.070 | 3.294 | 2.562 | 1.870 | 1.215 | 0.714 | 0.352 |
| 54.833 | 34.211 | 4.575 | 3.503 | 2.839 | 2.211 | 1.616 | 1.051 | 0.619 | 0.305 |
| 51.296 | 44.211 | 3.974 | 3.049 | 2.474 | 1.929 | 1.411 | 0.918 | 0.541 | 0.267 |
| 48.186 | 53.684 | 3.486 | 2.679 | 2.175 | 1.698 | 1.243 | 0.809 | 0.477 | 0.235 |
| 45.433 | 63.158 | 3.085 | 2.273 | 1.929 | 1.506 | 1.103 | 0.719 | 0.424 | 0.209 |
| 42.977 | 71.579 | 2.751 | 2.118 | 1.722 | 1.345 | 0.986 | 0.643 | 0.379 | 0.187 |
| 40.793 | 80.000 | 2.469 | 1.902 | 1.548 | 1.209 | 0.887 | 0.578 | 0.341 | 0.168 |
| 38.784 | 87.368 | 2.230 | 1.719 | 1.399 | 1.093 | 0.802 | 0.523 | 0.308 | 0.152 |
| 36.980 | 93.684 | 2.024 | 1.561 | 1.271 | 0.993 | 0.729 | 0.475 | 0.280 | 0.138 |
| 35.336 | 100 | 1.847 | 1.424 | 1.160 | 0.907 | 0.665 | 0.434 | 0.256 | 0.126 |

(s) In the table in the above, the value of g has the same meaning as the case of Table 3. A movement amount of positive value shows a movement toward the object side.

TABLE 8

Lens data (a) When R: Radius curvature
D: Distance between lens surfaces
$n_d$: Refractive index for d-line
$\nu$: Abbe's number

| Surface No. | | R | D | nd | $\nu$ |
|---|---|---|---|---|---|
| 1 | | 154.085 | 2.00 | 1.80518 | 25.4 |
| 2 | | 71.160 | 7.00 | 1.62299 | 58.2 |
| 3 | First lens group | −408.750 | 0.10 | | |
| 4 | | 50.885 | 4.50 | 1.62299 | 58.2 |
| 5 | | 82.750 | Variable | | |
| 6 | | 133.870 | 1.20 | 1.77250 | 49.6 |
| 7 | | 17.125 | 6.44 | | |
| 8 | | −119.741 | 2.50 | 1.80518 | 25.4 |
| 9 | Second lens group | −37.040 | 1.00 | 1.77250 | 49.6 |
| 10 | | 73.977 | 0.10 | | |
| 11 | | 27.602 | 2.20 | 1.80518 | 25.4 |
| 12 | | 39.973 | Variable | | |
| 13 | | 65.439 | 4.75 | 1.58913 | 61.1 |
| 14 | | −20.400 | 1.00 | 1.80518 | 25.4 |
| 15 | Third lens group | −29.765 | 1.10 | | |
| 16 | | 21.416 | 3.46 | 1.51633 | 64.1 |
| 17 | | 65.918 | Variable | | |
| 18 | | 119.573 | 3.76 | 1.71736 | 29.5 |
| 19 | | −17.128 | 1.00 | 1.77250 | 49.6 |
| 20 | Fourth lens group | 41.633 | 1.49 | | |
| 21 | | −34.680 | 1.00 | 1.77250 | 49.6 |
| 22 | | 140.021 | Variable | | |
| 23 | | −129.801 | 4.95 | 1.71300 | 53.9 |
| 24 | | −16.485 | 1.00 | 1.80518 | 25.4 |
| 25 | | −27.188 | 0.30 | | |
| 26 | | −97.088 | 1.00 | 1.80610 | 40.9 |
| 27 | Fifth lens group | 24.597 | 7.50 | 1.58913 | 61.1 |
| 28 | | −45.921 | 0.30 | | |
| 29 | | 42.314 | 4.16 | 1.51633 | 64.1 |
| 30 | | 312.792 | | | |

TABLE 9

Focal length and distance between lens groups

| | Focal length | Back focal length | $D_5$ | $D_{12}$ | $D_{17}$ | $D_{22}$ |
|---|---|---|---|---|---|---|
| Tele-position | 131.863 | 72.799 | 46.113 | 3.870 | 7.384 | 2.437 |
| | 104.916 | 73.461 | 39.130 | 6.517 | 6.418 | 3.403 |
| | 90.899 | 72.846 | 38.467 | 8.121 | 5.902 | 3.919 |
| | 79.898 | 71.679 | 30.443 | 9.638 | 5.386 | 4.435 |
| | 70.786 | 70.141 | 26.780 | 11.165 | 4.890 | 4.931 |
| | 62.973 | 68.351 | 23.297 | 12.765 | 4.434 | 5.387 |
| | 55.982 | 66.532 | 19.734 | 14.474 | 3.968 | 5.853 |
| | 49.338 | 64.556 | 16.020 | 16.489 | 3.432 | 6.389 |
| | 42.840 | 62.379 | 12.007 | 19.006 | 2.796 | 7.025 |
| | 36.326 | 59.767 | 7.544 | 22.407 | 2.060 | 7.761 |
| Wide position | 28.969 | 56.044 | 1.880 | 28.120 | 1.124 | 8.697 |

TABLE 10

Movement amounts when focusing by moving the first and second lens groups

| Focal length | Value of g | U = 1.5 m | U = 2 m | U = 3 m | U = 5 m | U = 7 m | U = 1.5 m |
|---|---|---|---|---|---|---|---|
| 131.863 | 0 | 2.863 | 2.163 | 1.454 | 0.878 | 0.629 | 0.295 |

TABLE 10-continued

Movement amounts when focusing by moving the first and second lens groups

| Focal length | Value of g | U = 1.5 m | U = 2 m | U = 3 m | U = 5 m | U = 7 m | U = 1.5 m |
|---|---|---|---|---|---|---|---|
| 104.916 | 22.326 | 2.038 | 1.526 | 1.016 | 0.609 | 0.435 | 0.203 |
| 90.899 | 34.884 | 1.670 | 1.245 | 0.825 | 0.493 | 0.351 | 0.164 |
| 79.898 | 44.186 | 1.426 | 1.060 | 0.700 | 0.417 | 0.297 | 0.138 |
| 70.786 | 53.953 | 1.247 | 0.924 | 0.609 | 0.362 | 0.258 | 0.120 |
| 62.973 | 61.395 | 1.105 | 0.818 | 0.538 | 0.320 | 0.227 | 0.106 |
| 55.982 | 68.837 | 0.984 | 0.727 | 0.478 | 0.284 | 0.202 | 0.093 |
| 49.338 | 76.279 | 0.898 | 0.648 | 0.425 | 0.252 | 0.179 | 0.083 |
| 42.840 | 83.721 | 0.781 | 0.575 | 0.377 | 0.223 | 0.159 | 0.073 |
| 36.326 | 91.163 | 0.691 | 0.508 | 0.333 | 0.197 | 0.140 | 0.065 |
| 28.969 | 100 | 0.598 | 0.439 | 0.287 | 0.170 | 0.120 | 0.056 |

(r) In the table in the above, the value of g represents the position of the focal length located between the longest focal length selected as 0 and the shortest focal length selected as 100. A movement amount of positive value shows a movement toward the object side.

In FIG. 11, there is shown a mechanism in which all lenses of a zoom lens composed of two groups prior to which a negative group is provided shown in FIG. 3 are moved to carry out focusing. In this case, a focusing cam has a shape of the curve shown in FIG. 8b. Values of g are as shown in Table 7.

In FIG. 11, FIG. 11 (a) is a sectional view, in which, a reference numeral 1 denotes a first lens group having a negative focal length and 2 a second lens group having a positive focal length.

While in FIG. 3, the first group is composed of four lenses, and the second group is composed of five lenses, it will be noted that in zooming and in focusing, the lenses which constitute the respective groups are moved together and therefore, a single lens is typically used in this explanation.

A reference numeral 3 denotes a fixed ring which is attached to the camera through a mount (not shown). 4 is a zoom ring having a cam groove for zooming, a groove for controlling movement of said ring in a direction of an optical axis, and a cam groove for varying the ratio of variation of the focal length in accordance with the value of g. 5 is a ring which rotates in accordance with the variation of the ring 4 in the groove for g. 6 is a ring which in zooming, rotates in accordance with the value of g with respect to the rotation of the zoom ring and in focusing, prevents rotation of the zoom ring. 7 is a focusing ring having a focusing cam groove (having a shape of the curve shown in FIG. 8b) for focusing 8 is a pin for connecting the first lens group to the zoom ring 4 and 9 is a pin for connecting the second lens group thereto. 10 is a pin for fixing the zoom ring 4 and ring 5 in the direction of the optical axis, the pin being secured to ring 5. 11 is a pin for rotating ring 5 along the groove for g. A pin 12 is secured to the ring 5 and connected to a groove in the focusing cam 7. 13 is a pin secured to the ring 6, the pin 13 being free in zooming, and secures ring 6 to the fixed ring 3 in focusing. 14 is a pin secured to the ring 7 in which the pin 14 is free in focusing and secures the ring 7 to the fixed ring 3 in zooming.

FIG. 11b is a plan view of the fixed ring 3. 15 is a guide groove for the pins 8, 9 and 11. 16 is a groove engaging pin 13 for preventing movement of the ring 6 in the direction of the optical axis. 17 is a groove engaging pin 14 for preventing movement of the ring 7 in the direction of the optical axis.

FIG. 11 (c) is a plan view of the zoom ring 4. 18 and 19 are grooves for controlling zoom movement of the first lens group and the second lens group, respectively. 20 is a groove for controlling the ring 4 and ring 5 so that they may be moved together by pin 10 in the direction of the optical axis. 21 is a groove for g having the value of g in Table 7.

FIG. 11 (d) is a plan view of the ring 5. 22 is a groove for rotating the ring 5 along the groove for g of the ring 4 by the pin 11. This groove is formed with a step so as to prevent the pin 11 from slipping out.

FIG. 11 (e) is a plan view of the ring 6. 21 is a groove for preventing rotation of the ring 5 during focusing.

FIG. 11 (f) is a plan view of the focusing ring 7. 24 is a focusing cam groove in the shape of the curve shown in FIG. 8b. 23 is a groove for causing the pin not to act on the focusing ring.

It is now assumed that the mechanism of FIG. 11 is set so that the focal length of the zoom lens is set with respect to a certain object at an end of wide angle.

In FIG. 11 (c) plan view of the zoom ring 4, assume that A is the wide angle end and B is the telephoto end. The pins 8, 9, 10 and 11 are at the A end of the grooves 18, 19, 20 and 21, and the pin 12 is at the $A_1$ of the focusing cam groove 22 in FIG. 11 (c). Now, the focusing ring 7 is secured to the fixed ring 3 by the pin 14 to accomplish zooming from the wide angle end to the telephoto end. When the zoom ring 4 is rotated, the pins 8, 19 and 11 are moved in a direction of an optical axis by the grooves 18, 19 and 21 and the guide groove 15 in the fixed ring 3 (FIG. 11b). The first lens group 1 and the second lens group 2 are connected to the grooves 18 and 19 of the zoom ring by the pins 8 and 9, and therefore moved through a predetermined distance to effect zooming. Since the pin 11 slides in the groove 21 for g and in the groove 22 of the ring 5, the ring 5 is moved in the direction of the optical axis by the pin 11, and rotates in accordance with the value of g. When the pin 13 is free in zooming, the pin 12 secured to the ring 5 is connected to the focusing cam groove 24 of focusing ring 1, and therefore, the ring 6 is moved from $A_1$ to $B_1$ along the focusing cam groove 24 while rotating. Thus, the ring 5 is moved through a differential portion in the direction of the optical axis from $A_1$ to $B_1$ of the focusing groove 24. Since the zoom ring 4 and the ring 5 are controlled so that they are moved together in a direction of the optical axis by the pin 10, the first lens group 1 and the second lens group 2 connected to the zoom ring 4 by the pins 8 and 9 are also moved through a differential portion in a direction of the optical axis from $A_1$ to $B_1$.

The first lens group and the second lens group are moved in a direction of an optical axis through a differential portion in a direction of the optical axis from $A_2$ to $B_2$ when focusing is locked by 5 m, and through a differential portion in a direction of an optical axis form $A_3$ to $B_3$ when focusing is locked by 0.8 m. If a certain range where the angle of rotation in the focusing cam groove 24 of the focusing cam ring 7 is the same, when zooming is carried out with respect to an object at a suitable distance, focusing plane can be maintained constant.

Next, focusing will be described in the case when the focal length is held constant. When ring 5 is secured to the fixed ring 3 by the pin 13 and the pin 14 is made free, the focusing ring 6 can be rotated freely.

For the sake of explanation, the focal length is made to be the wide angle end. If the focusing ring is at oo, the pin 12 is at a position $A_1$ of the focusing cam groove 24 in the focusing ring 7. When the focusing ring 7 is rotated by 5 m from oo, the pin 12 secured to the ring 5 is moved in the direction of the optical axis through a differential portion in a direction of an optical axis from $A_1$ to $A_2$ by the guide groove 21 in the ring 6, since the ring 6 is locked. Since the zoom ring 4 is controlled so that it is moved in a direction of an optical axis together with the ring 5 by the pin 10, the first lens group and the second lens group connected to the zoom ring 4 by the pins 8 and 9 are also moved through a differential portion in the direction of the optical axis from $A_1$ to $A_2$.

In this manner, even if the distance of the object is varied from oo to 5 m, the focusing cam groove 24 in the focusing ring 7 can be used to effect focusing. When the object distance is varied from 5 m to 0.8 m, the focusing ring 24 is rotated from $A_2$ to $A_3$ to move the first lens group and the second lens group through a differential portion in the direction of the optical axis from $A_2$ to $A_3$ to effect focusing.

In FIG. 12, there is shown a mechanism in which in the zoom lens composed of two groups prior to which a negative group is provided shown in FIG. 3, the eighth lens and ninth lens included in the second lens group are moved to effect focusing. In this case, the focusing cam has the shape of the curve shown in FIG. 7b. Values of g are as shown in Table 6.

In FIG. 12, FIG. 12 (a) is a sectional view, in which reference numeral 31 denotes a first lens group having a negative focal length, 32 denotes 5th, 6th and 7th lenses included in a second lens group, and 33 denotes 8th and 9th lenses included in the second lens group used for focusing. The 1st to 4th lenses included in the first lens group and the 5th, 6th and 7th lenses included in the second lens group are moved together at the time of zooming as well as at the time of focusing. The 8th and 9th lenses included in the second lens group are moved together with the 5th to 7th lenses at the time of zooming, but only two lenses are moved together at the time of focusing. Therefore, a single lens is typically used in this explanation.

A reference numeral 34 denotes a fixed ring which is attached to the camera through a mount (not shown). 35 is a first zoom ring having a cam groove for zooming of the 5th to 7th lenses included in the first lens group and the second lens group, a pin for preventing movement of said ring in the direction of the optical axis and a pin for providing integral rotation with a ring 36 which will be described hereinafter. 36 is a second zoom ring having a cam groove for zooming of the 8th and 9th lenses included in the second lens group, a groove for controlling movement of said ring in the direction of the optical axis, a cam groove for varying the ratio of variation in focal length in accordance with the value of g, and a groove for providing integral rotation with said ring 35. 37 is a ring which is rotated in accordance with the variation in the groove for g. 38 is a ring which is rotated in accordance with the value of g with respect to the rotation of the first zoom ring at the time of zooming, and prevents rotation of the first and second zoom rings at the time of focusing. 39 is a focusing ring having a focusing cam groove (which has a shape of a curve in FIG. 7b) for focusing. 40 is a pin on the first zoom ring 35 for preventing movement of the same in the direction of the optical axis. 41 is a pin for connecting the first lens group to the first zoom ring 35. 42 is a pin for connecting the 5th to 7th lenses included in the second lens group to the first zoom ring 35. 43 is a pin on the first zoom ring 35 for providing integral rotation of the same with the second zoom ring 36. 44 is a pin for connecting the 8th and 9th lenses included in the second lens group to the second zoom ring 36. 45 is a pin on ring 37 for locking the second zoom ring 36 and the ring 37 in the direction of the optical axis. 46 is a pin for rotating the ring 37 in accordance with the groove 36 for g. 47 is a pin secured to the ring 37 and connected to the focusing cam groove 39. 48 is a pin which is secured to the ring 38 and in which it is free at the time of zooming, and is used to lock the fixed ring 34 to the ring 38 at the time of focusing. 49 is a pin which is secured to the ring 39 and in which it is free at the time of focusing, and is used to lock the ring 39 to the fixed ring 34 at the time of zooming.

FIG. 12 (b) is a plan view of the fixed ring 34. 50 is a groove for preventing movement of the first zoom ring 35 in the direction of the optical axis by the pin 40. 51 is a guide groove for the pins 41, 42, 44 and 45. 52 is a groove for preventing movement of the ring 38 in the direction of the optical axis by the pin 48, and 53 is a groove for preventing movement of the ring 39 in the direction of the optical axis by the pin 49.

FIG. 12 (c) is a plan view of the first zoom ring 35. 54 and 55 are respectively grooves for controlling zoom movement of the 5th to 7th lenses included in the first lens group and the second lens group.

FIG. 12 (d) is a plan view of the second zoom ring 36. 56 is a groove for providing integral rotation of the first zoom ring 35 and the second zoom ring 36 by the pin 43. 57 is a groove for controlling movement of zoom movement of the 8th and 9th lenses included in the second lens group, the groove 57 having the same shape as that of the groove 55 in first zoom ring 35. 58 is a groove for controlling the rings 36 and 37 so that they may be moved together in the direction of the optical axis by the pin 45. 59 is a groove for g having values g in Table 6.

FIG. 12 (e) is a plan view of the ring 37. 60 is a groove for rotating the ring 37 in accordance with the groove 59 for g of the second zoom ring 36 by the pin 46. This groove 60 has a step so that the pin 46 does not slip out.

FIG. 12 (f) is a plan view of the ring 38. 61 is a groove for preventing rotation of the ring 37 at the time of focusing.

FIG. 12 (g) is a plan view of the focusing ring 39. 62 is a focusing cam groove having the shape of the curve shown in FIG. 7b. 63 is a groove for preventing pin 48 from acting on the focusing ring 39.

Now, when the first zoom ring 35 is rotated, the second zoom ring 36 is likewise rotated by the pin 43. The pin 43 moves in the groove 56 of the second zoom lens and therefore is free from control in the direction of the optical axis. Accordingly, similar to the embodiment of FIG. 11, the pin 47 moves slightly in the direction of the optical axis by the action of focusing cam groove 62 and groove 61, whereby the ring 37 and the second zoom ring 36 which moves in the direction of the optical axis integrally therewith are moved in the direction of the optical axis, and the 8th and 9th lenses are also moved slightly in the direction of the optical axis from the 5th lens to the 7th lens by the pin 44. This makes zooming under well focused conditions possible.

At the time of focusing, the focusing ring 39 is rotated, thereby the pin 47 is moved back and forth along the focusing cam groove 62, and the second zoom ring 36 is moved in the direction of the optical axis in a manner similar to the former, and focusing is carried out by the movement of the 8th and 9th lenses 33 in the direction of the optical axis.

FIG. 13 shows a mechanism in which in the zoom lens composed of five groups as shown in FIG. 9, the first group and the second group are moved to effect focusing.

In this case, the focusing cam groove has a shape of the curve shown in FIG. 10b. The value of g is as shown in Table 10.

In FIG. 13, FIG. 13 (a) is a sectional view. Reference numerals 71, 72, 73, 74 and 75 are respectively the 1st, 2nd, 3rd, 4th and 5th lens groups having the focal length of positive, negative, positive, negative and positive. 76 is a fixed ring which is attached to the camera through a mount (not shown). 77 is a first lens ring having a cam groove for zooming the first and second lens group, a groove for controlling movement of said ring in the direction of the optical axis, and a groove for providing integral rotation with the aforesaid ring 77. 79 is a ring which is rotated in accordance with variation in the groove 77 for g. 80 is a ring which is rotated in accordance with the value of g with respect to the rotation of the first zoom ring at the time of zooming, and which prevents rotation of the second zoom ring at the time of focusing. 81 is a focusing ring having a focusing cam groove for focusing, which is in the shape of the curve shown in FIG. 10b. 82 and 83 are respectively pins for connecting the first and second lens groups to the first zoom ring. 84 is a pin which locks the first zoom ring 77 and the ring 79, said pin being secured to the ring 79. 85 is a pin for rotating the ring 70 along the groove 77 for g. 86, 87 and 88 are respectively pins for connecting the 3rd, 4th and 5th lens groups to the second zoom ring 78. 89 is a pin for providing integral rotation with the first zoom ring 77 and the second zoom ring 78. 90 is a pin on the second zoom ring 78 for preventing movement thereof in the direction of the optical axis. 91 is secured to the ring 79 and connected to the focusing groove. 92 is a pin which is secured to the ring 80 and in which it is free at the time of zooming, and locks the ring 80 to the fixed ring 76 at the time of focusing. 93 is a pin which is secured to the ring 81 and in which it is free at the time of focusing, and locks the ring 81 to the fixed ring 76 at the time of zooming.

FIG. 13 (b) is a plan view of the fixed ring 76. 94 is a guide groove for the pins 82, 83, 85, 86, 87 and 88. 95 is a groove for preventing movement of the second zoom ring 78 in the direction of the optical axis by the pin 90. 96 is a groove which prevents movement of the ring 80 in the direction of the optical axis by the pin 92, and 97 is a groove for preventing movement of the ring 81 in the direction of the optical axis by the pin 93.

FIG. 13 (c) is a plan view of the first zoom ring 87. 98 and 99 are respectively grooves for controlling movement of the first and second lens groups 71 and 72. 100 is a groove for controlling the rings 77 and 79 so that they are moved together in the direction of the optical axis by the pin 84. 101 is a groove for g having the value of Table 10.

FIG. 13 (d) is a plan view of the second zoom ring 78. 102 is a groove for providing integral rotation of the first zoom ring 77 and the zoom ring 78 by the pin 89. 103, 104 and 105 are grooves for controlling zoom movement of the 3rd, 4th and 5th lens groups.

FIG. 13 (e) is a plan view of the ring 79. 106 is a groove for rotating the ring 79 along the groove 101 for g of the first zoom ring 77 by the pin 85.

FIG. 13 (f) is a plan view of the ring 80. 107 is a groove for preventing rotation of the ring 79 at the time of focusing.

FIG. 13 (g) is a plan view of the focusing ring 81. 108 is a focusing cam groove in the shape of the curve shown in FIG. 10b. 109 is a groove for preventing the pin 92 on ring 80 from acting on the focusing ring 81.

When the first zoom ring 77 is rotated, the second zoom ring 78 is likewise rotated by the pin 89 on ring 77. Since the pin 89 slides in groove 102 of the second zoom ring 78, the movement of the first zoom ring in the direction of the optical direction is not restricted by the second zoom ring. Thus, the focusing lenses 71 and 72 have a function similar to that as described in connection with FIGS. 11 and 12 and, therefore, the focusing groove 108 in ring 81 can be used to effect maintenance of the focused condition at the time of zooming and focusing.

We claim:

1. A focusing mechanism for a zoom lens comprising a focusing lens group for focusing on an object, said focusing lens group comprising at least one focusing lens positioned behind a front lens group, said front lens group being positioned nearest to said object;

a zooming lens group for zooming said object, a focusing ring having a focusing cam groove, said cam groove having a shape defined by curve $D_T$, curve $D_T$ being defined by determining individual curves representing a necessary amount of corrective movement to be imparted upon said focusing lens group to prevent a focal surface from deviating with respect to a distance of each object being focused upon during zooming, and origin-moving and superposing said individual curves, said focusing cam groove moving said focusing lens group in relation to the portion of said $D_T$ curve corresponding to the distance of an object being focused upon, and, a zoom ring having at least two cam grooves, said zoom ring being adapted to adjust a position of said focusing lens by a link mechanism which transfers movement of said zoom ring to said focusing ring during zooming.

2. A focusing mechanism according to claim 1, wherein an operating amount of the focusing ring is converted by a cam groove indicative of value g which determines the relationship between said operating amount and a varying amount of the focal length of a lens system, and the movement amount of said zoom ring by said focusing cam is determined in accordance with said converted value.

3. A focusing mechanism according to claim 1, wherein said zoom ring is composed of at least two portions, one zoom ring having a cam groove for the lens group moved for zooming, the other zoom ring having a zooming cam groove for the lens group moved for focusing, said both zoom rings being rotated integrally at the time of zooming whereas they may be moved independently of each other in the direction of the optical axis.

4. A method of focusing a zoom lens comprising moving a focusing lens group along a curve $D_T$ formed upon a focusing ring for focusing an object, curve $D_T$ being defined by determining individual curves representing a necessary amount of corrective movement to be imparted upon said focusing lens group to prevent a focal surface from deviating with respect to the distance of each object being focused upon during zooming, and origin-moving and superposing said individual curves, said focusing lens group comprising at least one focusing lens positioned behind a front lens group, said front lens group being positioned nearest to said object, zooming said object by moving a zooming lens group, and adjusting a focusing condition by converting movement of said zooming lens group to movement of said focusing lens along said curve $D_T$ in accordance with said zooming.

5. The method of claim 4 wherein degree of accuracy in approximation of said moving amount along curve $D_T$ is enhanced by adjusting the rate of zooming.

6. The method of claim 5 wherein at least one lens of a first focusing lens group nearest to an object being focused, and a second focusing lens group adjacent to said first focusing lens group, is moved to focus said zoom lens.

7. The method of claim 5 further comprising
(a) enabling said focusing lens to be moved along the following exponential curve; and $$S = R(2 \log R^{f} - \log R^{u})$$

wherein
R is adequate positive real number
U is object distance
$f_f$ is focal length of the focusing lens group
S is movement amount of each focusing lens
(b) utilizing a part of said exponential curve S corresponding to a specific distance to an object to be focused to carry out the movement of said focusing lens in association with zooming.

8. A method of focusing a zoom lens as set forth in claim 4 characterized in that both said lens group nearest to an object to be focused and said second lens group adjacent to the afore-mentioned lens group as a whole are moved as a focusing lens.

9. A method of focusing a zoom lens in which at least one of a plurality of lenses constituting lens groups other than a lens group nearest to an object to be focused, is moved for focusing characterized by the steps of:
(a) enabling said focusing lens to be moved along the following exponential curve; and $$S = R(2 \log R^{f} - \log R^{u})$$

wherein
R is adequate positive real number
U is object distance
$f_f$ is focal length of the focusing lens group
S is movement amount of each focusing lens
(b) utilizing a part of said exponential curve S corresponding to a specific distance to an object to be focused to carry out the movement of said focusing lens in association with zooming.

10. A zoom lens system having the numerical data given in Table 1 below and a movement amount curve $D_T$ given in Table 2 below, and in which said lens system comprises two lens groups of which the first lens group includes four lenses and the second group includes five lenses:

TABLE 1

Lens data
(a) When R: Radius of curvature
D: Distance between lens surfaces
$n_d$: Refractive index for d-line
$v$: Abbe's number

| (b) Surface No. | | R | D | nd | v |
|---|---|---|---|---|---|
| 1 | | 172.036 | 3.50 | 1.62004 | 36.3 |
| 2 | | ∞ | 0.10 | | |
| 3 | (c) First | 82.224 | 1.70 | 1.77250 | 49.6 |
| 4 | lens group | 23.297 | 7.60 | | |
| 5 | | −373.238 | 1.50 | 1.77250 | 49.6 |
| 6 | | 69.199 | 5.50 | | |
| 7 | | 41.501 | 4.00 | 1.62004 | 36.3 |
| 8 | | 251.042 | (e) Variable | | |
| 9 | | 100.564 | | 1.69680 | 55.5 |
| 10 | | −292.325 | 2.60 | | |
| 11 | | 39.613 | 0.10 | 1.56883 | 61.1 |
| 12 | | 149.413 | 4.00 | | |
| 13 | (d) Second | 22.672 | 0.10 | 1.51633 | 64.1 |
| 14 | lens group | 96.429 | 5.50 | | |
| 15 | | −341.320 | 5.50 | 1.80518 | 25.4 |
| 16 | | 19.037 | 1.60 | | |
| 17 | | 85.004 | 5.00 | 1.62004 | 36.3 |
| 18 | | −38.022 | 4.50 | | |

TABLE 2

| | | Movement amounts when focusing by integrally moving the eighth and ninth lens components | | | | | | | |
|---|---|---|---|---|---|---|---|---|---|
| Focal length | Value of g | U = 0.8 m | U = 1 m | U = 1.2 m | U = 1.5 m | U = 2 m | U = 3 m | U = 5 m | U = 10 m |
| 69.140 | 0 | −1.566 | −1.205 | −0.980 | −0.765 | −0.560 | −0.365 | −0.215 | −0.106 |
| 63.608 | 11.515 | −1.404 | −1.082 | −0.881 | −0.688 | −0.505 | −0.329 | −0.194 | −0.096 |
| 58.896 | 22.424 | −1.268 | −0.978 | −0.797 | −0.623 | −0.457 | −0.298 | −0.176 | −0.087 |
| 54.833 | 32.727 | −1.151 | −0.889 | −0.725 | −0.567 | −0.416 | −0.272 | −0.160 | −0.079 |
| 51.296 | 42.424 | −1.051 | −0.813 | −0.662 | −0.519 | −0.381 | −0.249 | −0.147 | −0.073 |
| 48.186 | 51.515 | −0.964 | −0.746 | −0.608 | −0.476 | −0.350 | −0.229 | −0.135 | −0.067 |
| 45.433 | 60.606 | −0.888 | −0.687 | −0.561 | −0.439 | −0.323 | −0.211 | −0.124 | −0.062 |
| 42.977 | 69.091 | −0.821 | −0.636 | −0.519 | −0.406 | −0.299 | −0.195 | −0.115 | −0.057 |
| 40.773 | 76.970 | −0.762 | −0.590 | −0.481 | −0.377 | −0.277 | −0.181 | −0.107 | −0.053 |
| 38.784 | 84.242 | −0.709 | −0.549 | −0.448 | −0.351 | −0.258 | −0.169 | −0.100 | −0.049 |
| 36.980 | 91.515 | −0.662 | −0.513 | −0.418 | −0.328 | −0.241 | −0.157 | −0.093 | −0.046 |
| 35.336 | 100 | −0.620 | −0.480 | −0.391 | −0.307 | −0.225 | −0.147 | −0.087 | −0.043 |

(p) In the table in the above, the value of g represents the position of the focal length located between the longest focal length selected as 0 and the shortest focal length selected as 100. A movement amount of positive value shows a movement toward the object side.

11. A zoom lens system having the numerical data given in Table 1 below and movement amount curve $D_T$ given in Table 2 below:

TABLE 1

Lens data (a) When R: Radius of curvature
D: Distance between lens surfaces
$n_d$: Refractive index for d-line
$\nu$: Abbe's number

| (b) Surface No. | | R | D | nd | ν |
|---|---|---|---|---|---|
| 1 | | 172.036 | 3.50 | 1.62004 | 36.3 |
| 2 | | ∞ | 0.10 | | |
| 3 | (c) First lens group | 82.224 | 1.70 | 1.77250 | 49.6 |
| 4 | | 23.297 | 7.60 | | |
| 5 | | −373.238 | 1.50 | 1.77250 | 49.6 |
| 6 | | 69.199 | 5.50 | | |
| 7 | | 41.501 | 4.00 | 1.62004 | 36.3 |
| 8 | | 251.042 | | | |
| | | (e) Variable | | | |
| 9 | | 100.564 | | 1.69680 | 55.5 |

TABLE 1-continued

Lens data (a) When R: Radius of curvature
D: Distance between lens surfaces
$n_d$: Refractive index for d-line
$\nu$: Abbe's number

| (b) Surface No. | | R | D | nd | ν |
|---|---|---|---|---|---|
| 10 | | −292.325 | 2.60 | | |
| 11 | | 39.613 | 0.10 | 1.56883 | 61.1 |
| 12 | | 149.413 | 4.00 | | |
| 13 | (d) Second lens group | 22.672 | 0.10 | 1.51633 | 64.1 |
| 14 | | 96.429 | 5.50 | | |
| 15 | | −341.320 | 5.50 | 1.80518 | 25.4 |
| 16 | | 19.037 | 1.60 | | |
| 17 | | 85.004 | 5.00 | 1.62004 | 36.3 |
| 18 | | −38.022 | 4.50 | | |

TABLE 2

Movement amounts when focusing by moving the lens system as a whole

| Focal length | Value of g | U = 0.8 m | U = 1 m | U = 1.2 m | U = 1.5 m | U = 2 m | U = 3 m | U = 5 m | U = 10 m |
|---|---|---|---|---|---|---|---|---|---|
| 69.140 | 0 | 7.543 | 5.721 | 4.611 | 3.573 | 2.600 | 1.683 | 0.988 | 0.486 |
| 63.608 | 12.105 | 6.288 | 4.789 | 3.869 | 3.004 | 2.190 | 1.420 | 0.834 | 0.411 |
| 58.896 | 23.684 | 5.327 | 4.070 | 3.294 | 2.562 | 1.870 | 1.215 | 0.714 | 0.352 |
| 54.833 | 34.211 | 4.575 | 3.503 | 2.839 | 2.211 | 1.616 | 1.051 | 0.619 | 0.305 |
| 51.296 | 44.211 | 3.974 | 3.049 | 2.474 | 1.929 | 1.411 | 0.918 | 0.541 | 0.267 |
| 48.186 | 53.684 | 3.486 | 2.679 | 2.175 | 1.698 | 1.243 | 0.809 | 0.477 | 0.235 |
| 45.433 | 63.158 | 3.085 | 2.373 | 1.929 | 1.506 | 1.103 | 0.719 | 0.424 | 0.209 |
| 42.977 | 71.579 | 2.751 | 2.118 | 1.722 | 1.345 | 0.986 | 0.643 | 0.379 | 0.187 |
| 40.793 | 80.000 | 2.469 | 1.902 | 1.548 | 1.209 | 0.887 | 0.578 | 0.341 | 0.168 |
| 38.784 | 87.368 | 2.230 | 1.719 | 1.399 | 1.093 | 0.802 | 0.523 | 0.308 | 0.152 |
| 36.980 | 93.684 | 2.024 | 1.561 | 1.271 | 0.993 | 0.729 | 0.475 | 0.280 | 0.138 |
| 35.336 | 100 | 1.847 | 1.424 | 1.160 | 0.907 | 0.665 | 0.434 | 0.256 | 0.126 |

(s) In the table in the above, the value of g represents the position of the focal length located between the longest focal length selected as 0 and the shortest focal length selected as 100. A movement amount of positive value show a movement toward the object side.

12. A zoom lens system having the numerical data given in Table 1 below and movement amount curve $D_T$ given in Table 2 below:

TABLE 1

Lens data (a) When R: Radius curvature
D: Distance between lens surfaces
$n_d$: Refractive index for d-line
$\nu$: Abbe's number

| Surface No. | | R | D | nd | ν |
|---|---|---|---|---|---|
| 1 | | 154.085 | 2.00 | 1.80518 | 25.4 |
| 2 | | 71.160 | 7.00 | 1.62299 | 58.2 |
| 3 | First lens group | −408.750 | 0.10 | | |
| 4 | | 50.885 | 4.50 | 1.62299 | 58.2 |
| 5 | | 82.750 | Variable | | |
| 6 | | 133.870 | 1.20 | 1.77250 | 49.6 |
| 7 | | 17.125 | 6.44 | | |
| 8 | | −119.741 | 2.50 | 1.80518 | 25.4 |
| 9 | Second lens group | −37.040 | 1.00 | 1.77250 | 49.6 |
| 10 | | 73.977 | 0.10 | | |
| 11 | | 27.602 | 2.20 | 1.80518 | 25.4 |
| 12 | | 39.973 | Variable | | |
| 13 | | 65.439 | 4.75 | 1.58913 | 61.1 |
| 14 | | −20.400 | 1.00 | 1.80518 | 25.4 |
| 15 | Third lens group | −29.765 | 1.10 | | |
| 16 | | 21.416 | 3.46 | 1.51633 | 64.1 |
| 17 | | 65.918 | Variable | | |
| 18 | | 119.573 | 3.76 | 1.71736 | 29.5 |
| 19 | | −17.128 | 1.00 | 1.77250 | 49.6 |
| 20 | Fourth lens group | 41.633 | 1.49 | | |
| 21 | | −34.680 | 1.00 | 1.77250 | 49.6 |
| 22 | | 140.021 | Variable | | |

TABLE 1-continued

Lens data (a) When R: Radius curvature
D: Distance between lens surfaces
$n_d$: Refractive index for d-line
$\nu$: Abbe's number

| Surface No. | | R | D | nd | $\nu$ |
|---|---|---|---|---|---|
| 23 | | −129.801 | 4.95 | 1.71300 | 53.9 |
| 24 | | −16.485 | 1.00 | 1.80518 | 25.4 |
| 25 | | −27.188 | 0.30 | | |
| 26 | Fifth lens group | −97.088 | 1.00 | 1.80610 | 40.9 |
| 27 | | 24.597 | 7.50 | 1.58913 | 61.1 |
| 28 | | −45.921 | 0.30 | | |
| 29 | | 42.314 | 4.16 | 1.51633 | 64.1 |
| 30 | | 312.792 | | | |

TABLE 2

Movement amounts when focusing by moving the first and second lens groups

| Focal length | Value of g | U = 1.5 m | U = 2 m | U = 3 m | U = 5 m | U = 7 m | U = 15 m |
|---|---|---|---|---|---|---|---|
| 131.863 | 0 | 2.863 | 2.163 | 1.454 | 0.878 | 0.629 | 0.295 |
| 104.916 | 22.326 | 2.038 | 1.526 | 1.016 | 0.609 | 0.435 | 0.203 |
| 90.899 | 34.884 | 1.670 | 1.245 | 0.825 | 0.493 | 0.351 | 0.164 |
| 79.898 | 44.186 | 1.426 | 1.060 | 0.700 | 0.417 | 0.297 | 0.138 |
| 70.786 | 53.953 | 1.247 | 0.924 | 0.609 | 0.362 | 0.258 | 0.120 |
| 62.973 | 61.395 | 1.105 | 0.818 | 0.538 | 0.320 | 0.227 | 0.106 |
| 55.982 | 68.837 | 0.984 | 0.727 | 0.478 | 0.284 | 0.202 | 0.093 |
| 49.338 | 76.279 | 0.898 | 0.648 | 0.425 | 0.252 | 0.179 | 0.083 |
| 42.840 | 83.721 | 0.781 | 0.575 | 0.377 | 0.223 | 0.159 | 0.073 |
| 36.326 | 91.163 | 0.691 | 0.508 | 0.333 | 0.197 | 0.140 | 0.065 |
| 28.969 | 100 | 0.598 | 0.439 | 0.287 | 0.170 | 0.120 | 0.056 |

(r) In the table in the above, the value of g represents the position of the focal length located between the longest focal length selected as 0 and the shortest focal length selected as 100. A movement amount of positive value shows a movement toward the object side.

* * * * *